US006470085B1

(12) United States Patent
Uranaka et al.

(10) Patent No.: US 6,470,085 B1
(45) Date of Patent: Oct. 22, 2002

(54) APPLICATION PACKAGE AND SYSTEM FOR PERMITTING A USER TO USE DISTRIBUTED APPLICATION PACKAGE ON THE TERM OF THE USE THEREOF

(75) Inventors: Sachiko Uranaka, Tokyo; Masaki Kiyono, Kamakura, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 08/915,665

(22) Filed: Aug. 21, 1997

(30) Foreign Application Priority Data

Oct. 29, 1996 (JP) .............................. 8-286345

(51) Int. Cl.[7] .............................................. H04L 9/32
(52) U.S. Cl. ...................................................... 380/231
(58) Field of Search ................................ 380/202, 231; 705/51, 52, 56, 57, 58

(56) References Cited

U.S. PATENT DOCUMENTS

| | | | | |
|---|---|---|---|---|
| 5,319,705 A | * | 6/1994 | Halter et al. ................... | 705/54 |
| 5,440,631 A | * | 8/1995 | Akiyama et al. ............. | 705/53 |
| 5,857,020 A | * | 1/1999 | Peterson, Jr. ................ | 705/52 |
| 5,907,617 A | * | 5/1999 | Ronning ....................... | 705/52 |

FOREIGN PATENT DOCUMENTS

| | | |
|---|---|---|
| JP | 7-288519 | 10/1995 |
| JP | 7-295674 | 11/1995 |
| JP | 8-54951 | 2/1996 |

OTHER PUBLICATIONS

Schneier, Applied Cryptography, Oct. 1995, John Wiley and Sons, Inc., p. 368.*
Menezes et al. Handbook of Applied Cryptography, CRC Press, Oct. 17, 1996, p. 397.*

* cited by examiner

Primary Examiner—Gail Hayes
Assistant Examiner—Bryan Lathan
(74) Attorney, Agent, or Firm—Israel Gopstein; Clark & Brody

(57) ABSTRACT

A system for permitting only an authentic user to play a desired application contained in a distributed application package in one of predetermined operation, e.g., free play mode, charged mode, limit-attached play mode, etc. The system comprises a client for playing an application under the control of a server connected with the client through a communication network. The application package (the volume) includes a distribution descriptor which contains mode codes assigned to the volume and the applications of the volume. The data of distribution descriptor is decided and stored in the descriptor at the time of distribution of the volume. This feature makes the system flexible. There is also disclosed a system operatable without communicating with a server.

42 Claims, 23 Drawing Sheets

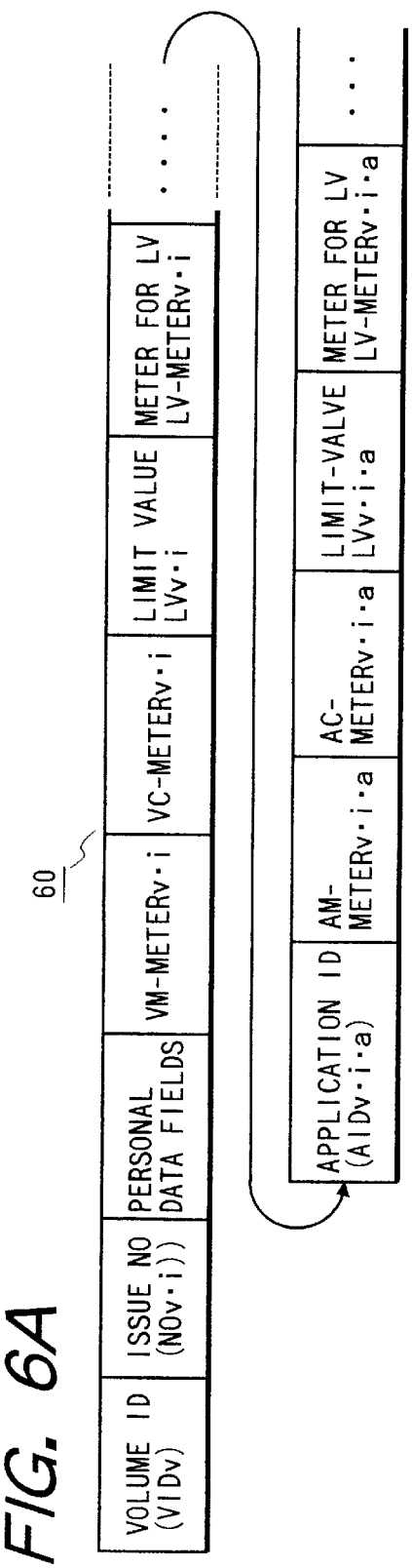
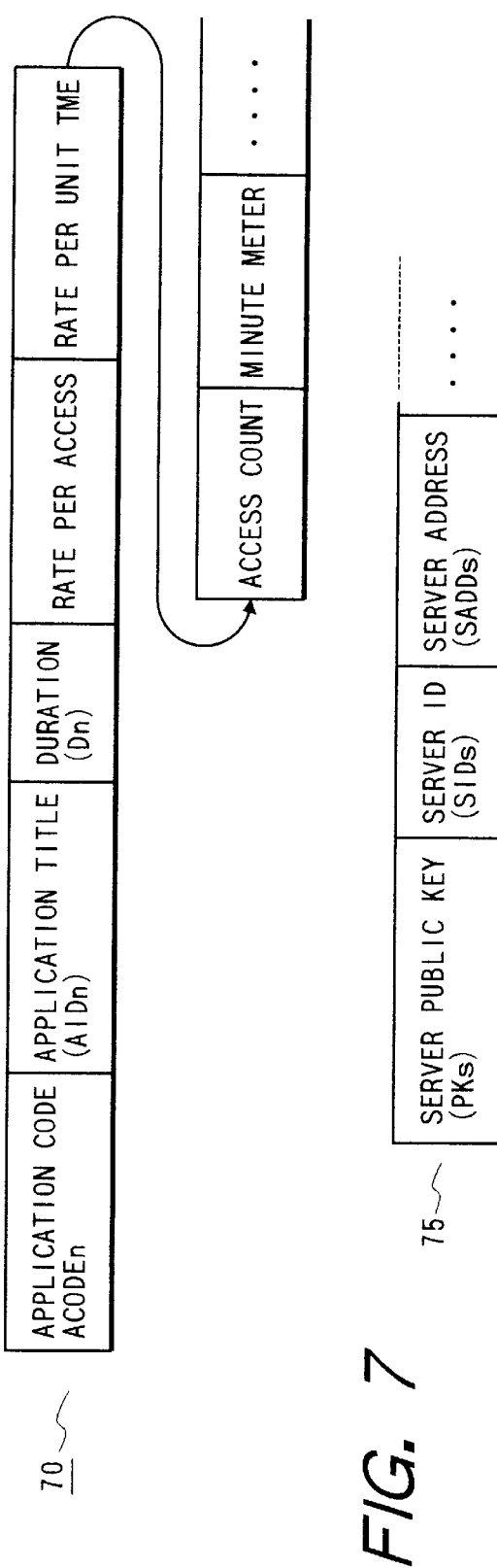

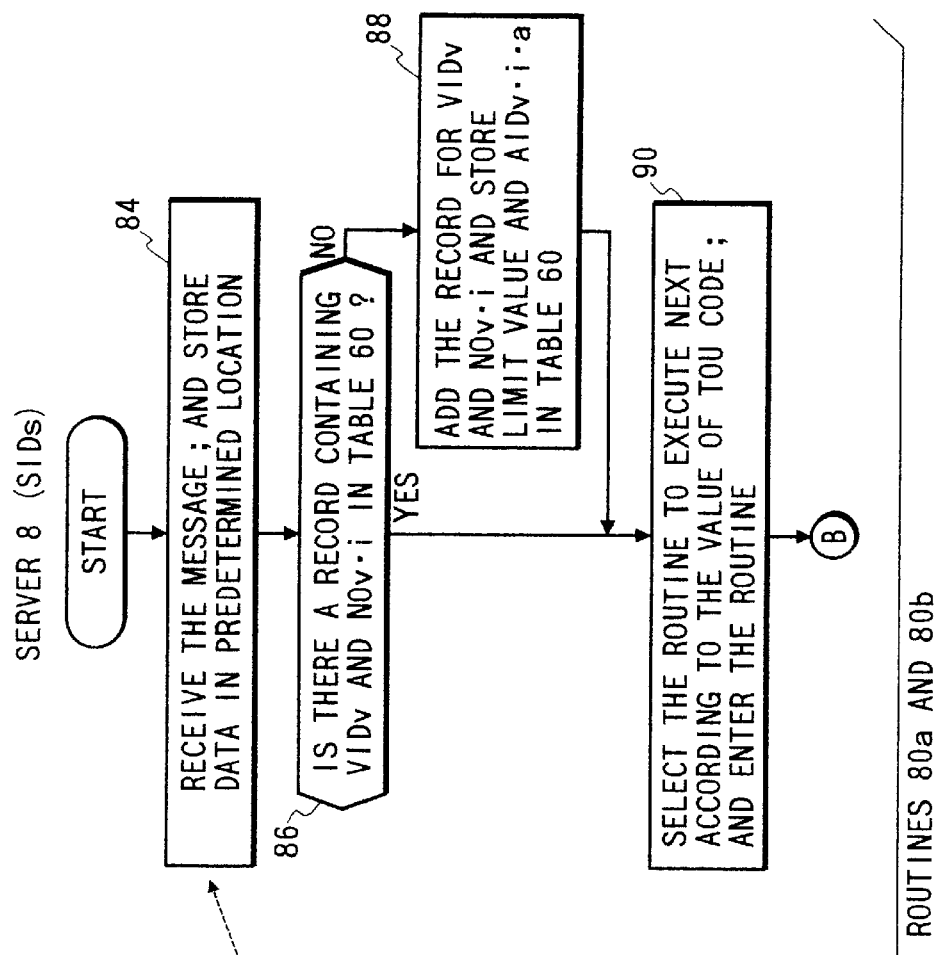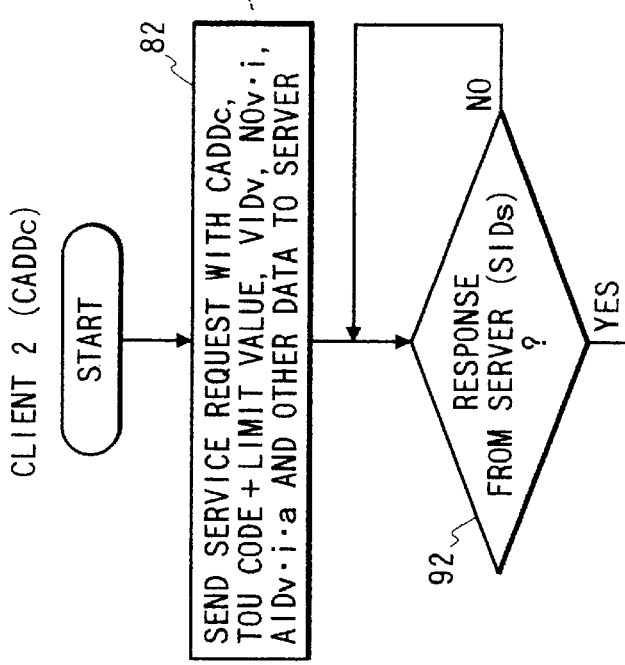

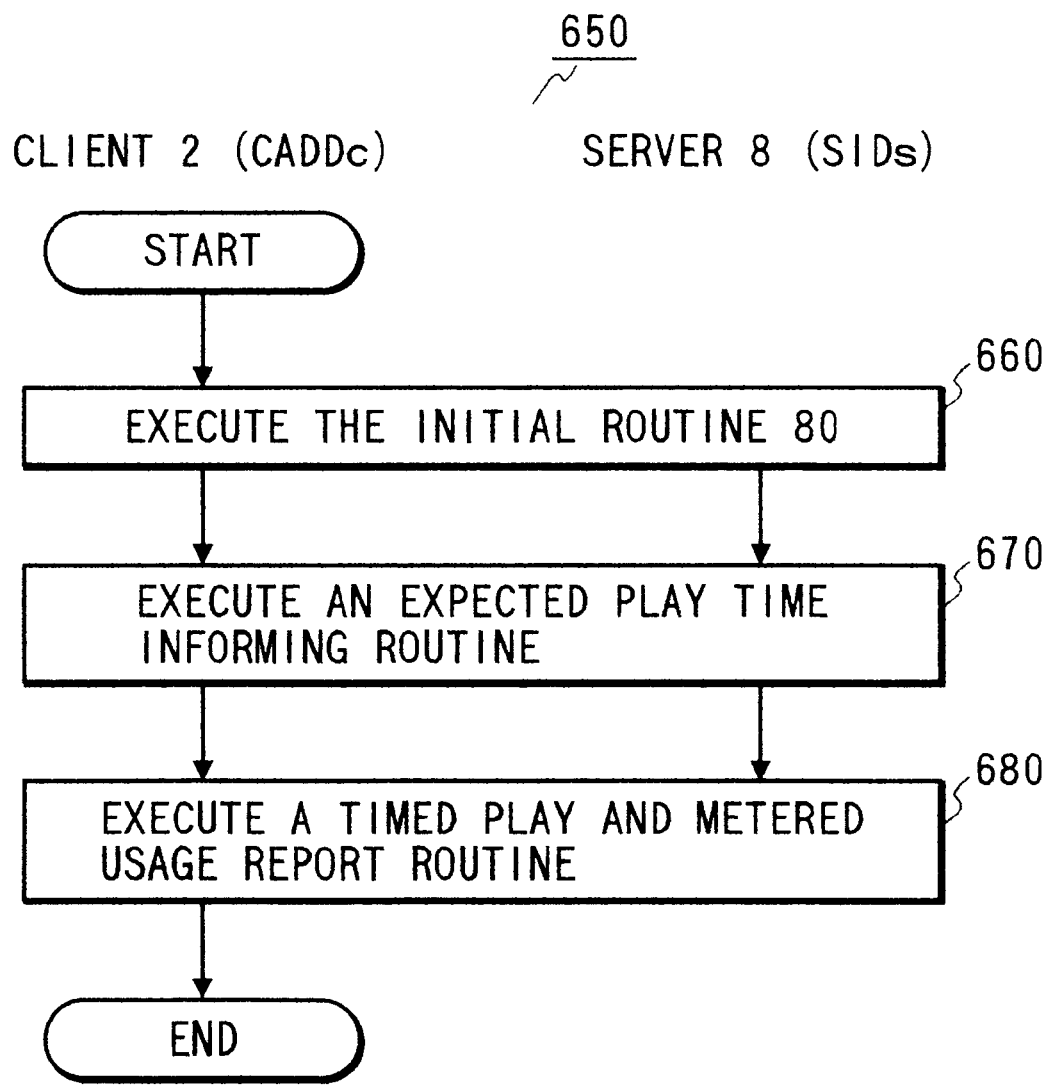

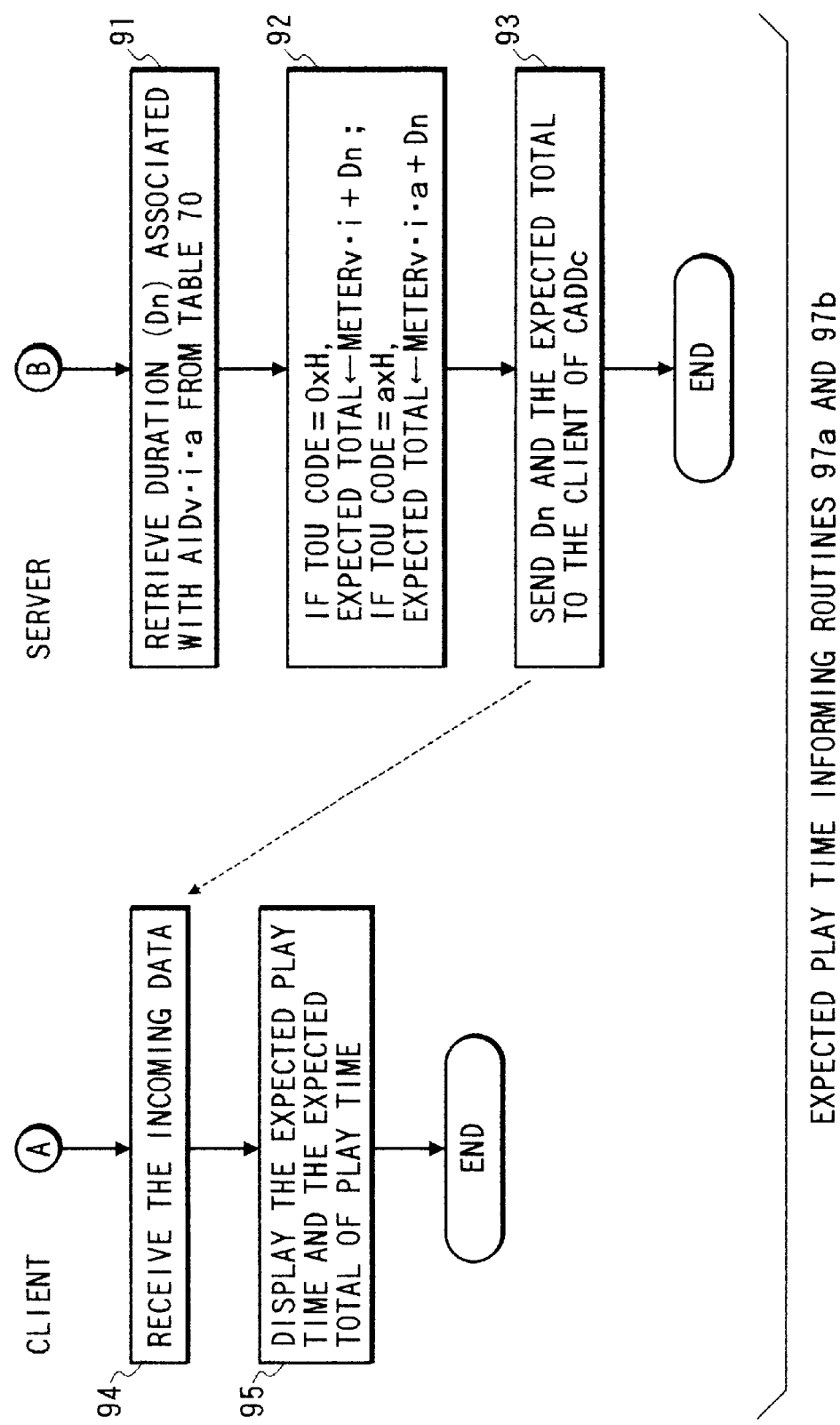

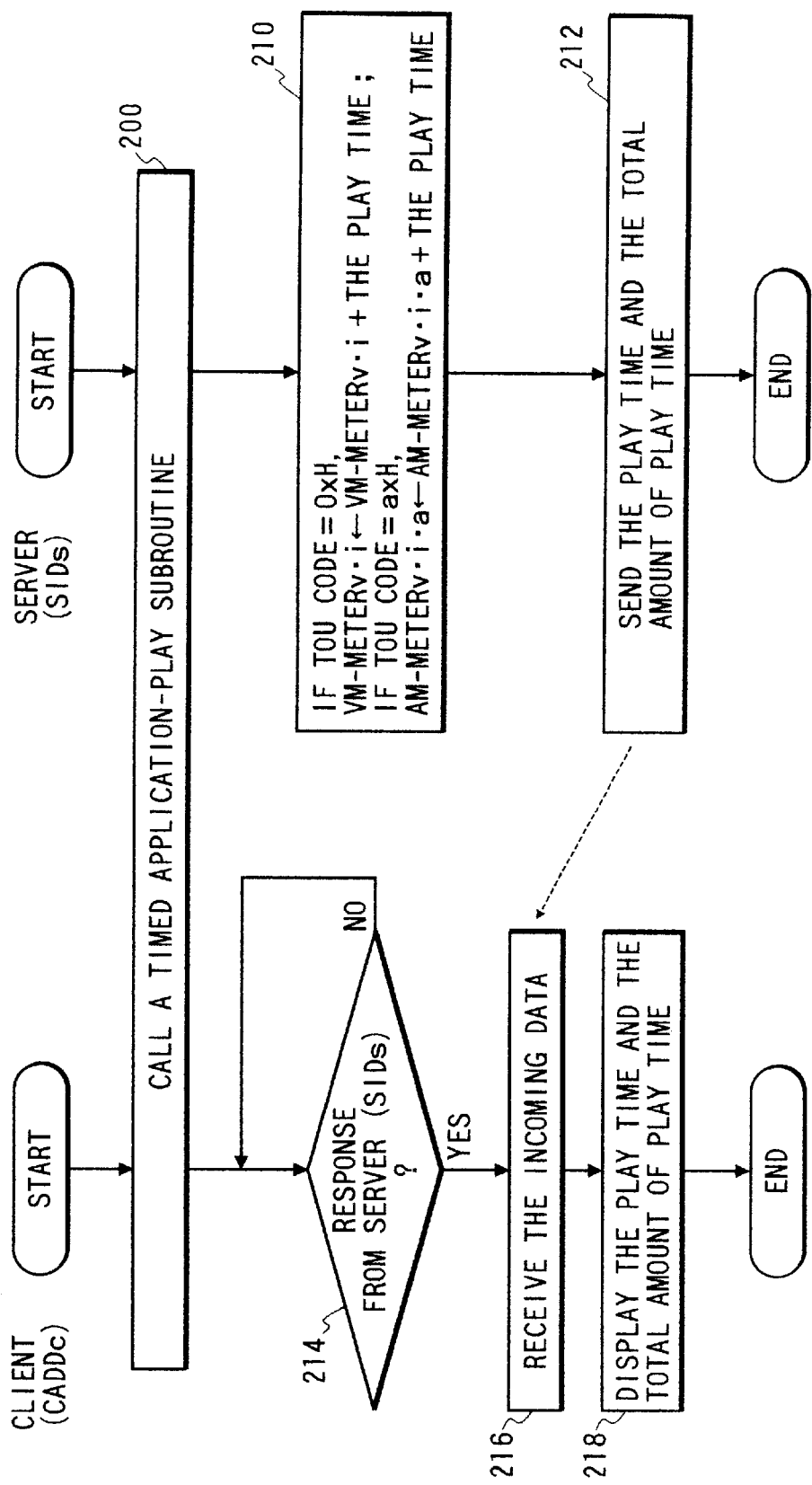

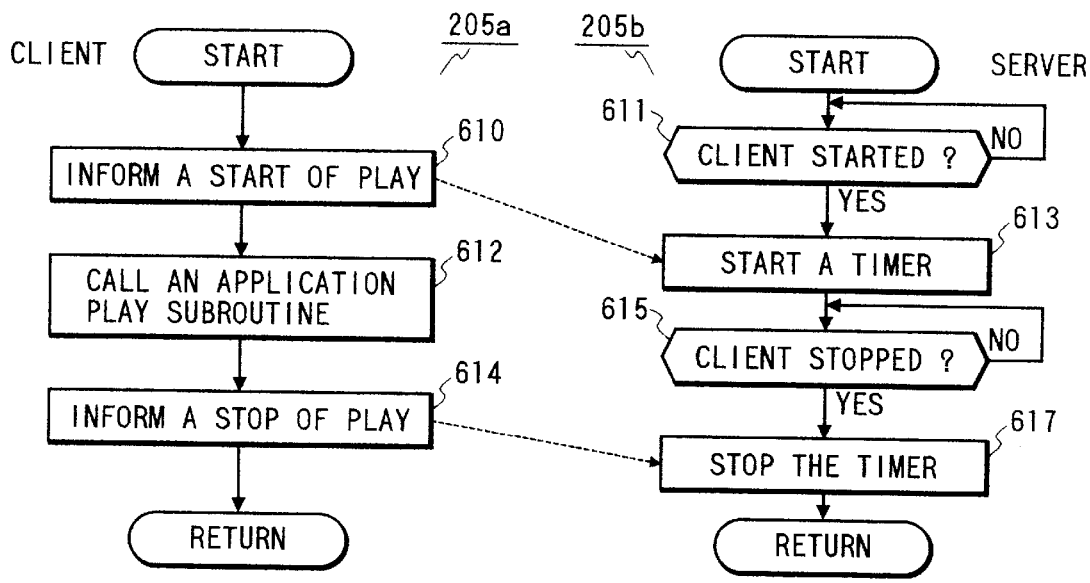
*FIG. 12A* *FIG. 12B*
TIMED APPLICATION-PLAY SUBROUTINES
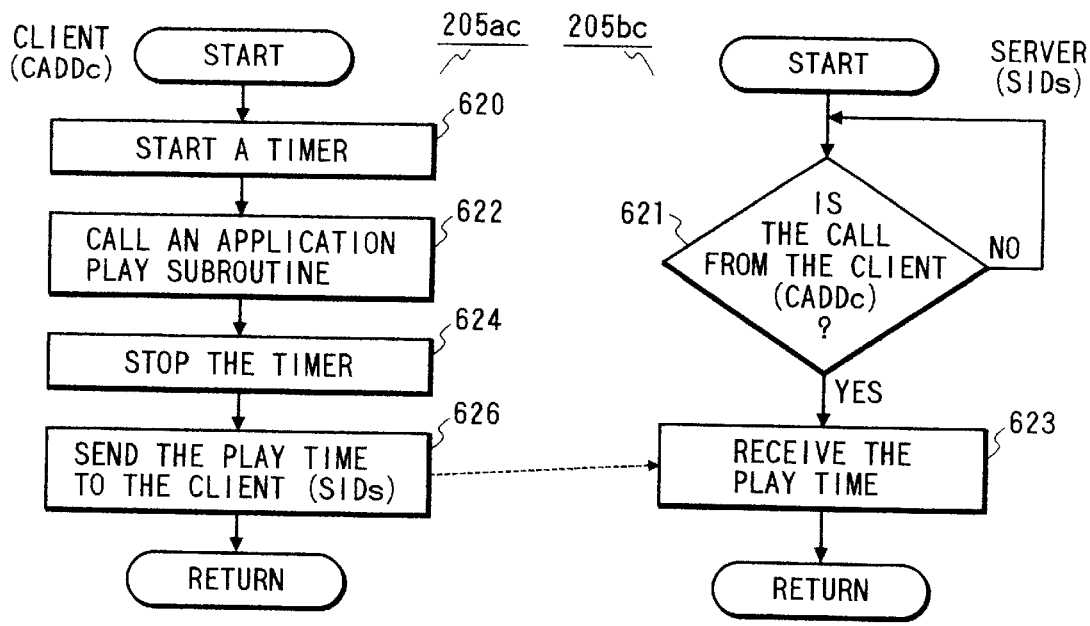
*FIG. 13A* *FIG. 13B*
TIMED APPLICATION-PLAY SUBROUTINES

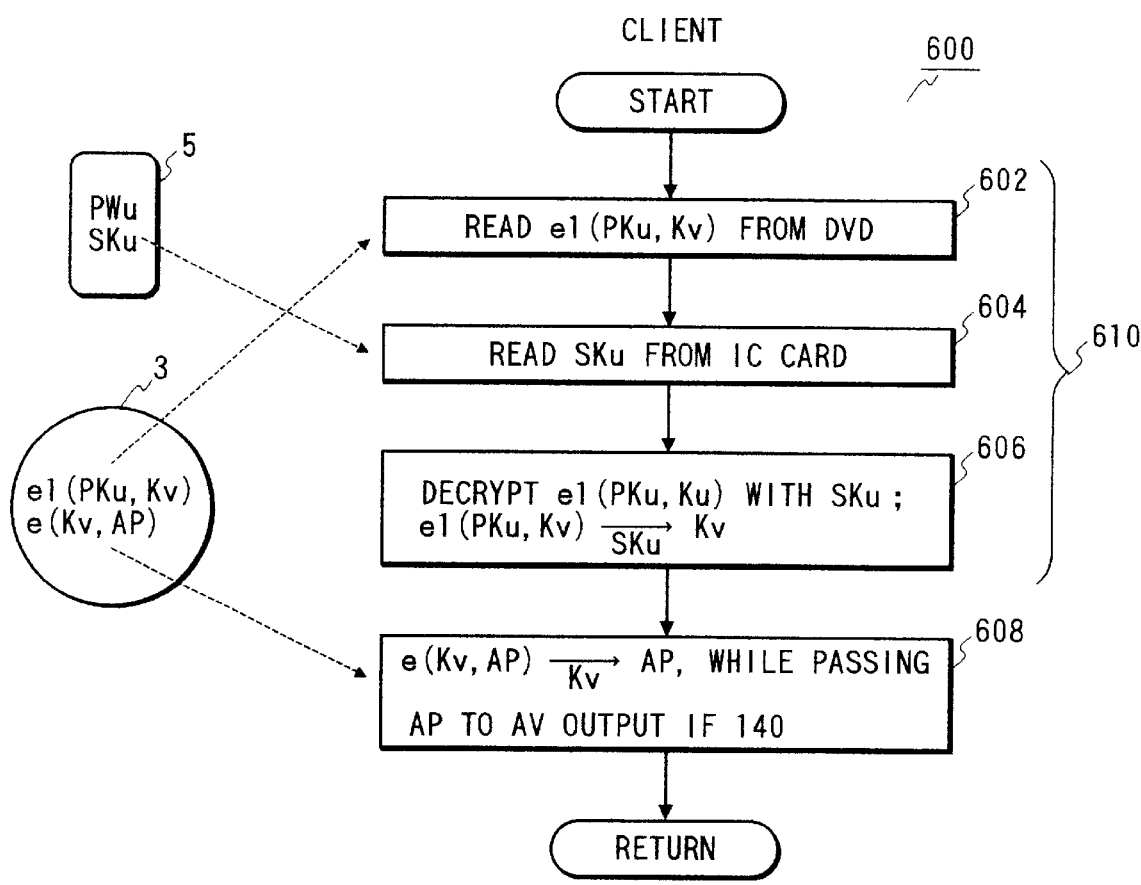

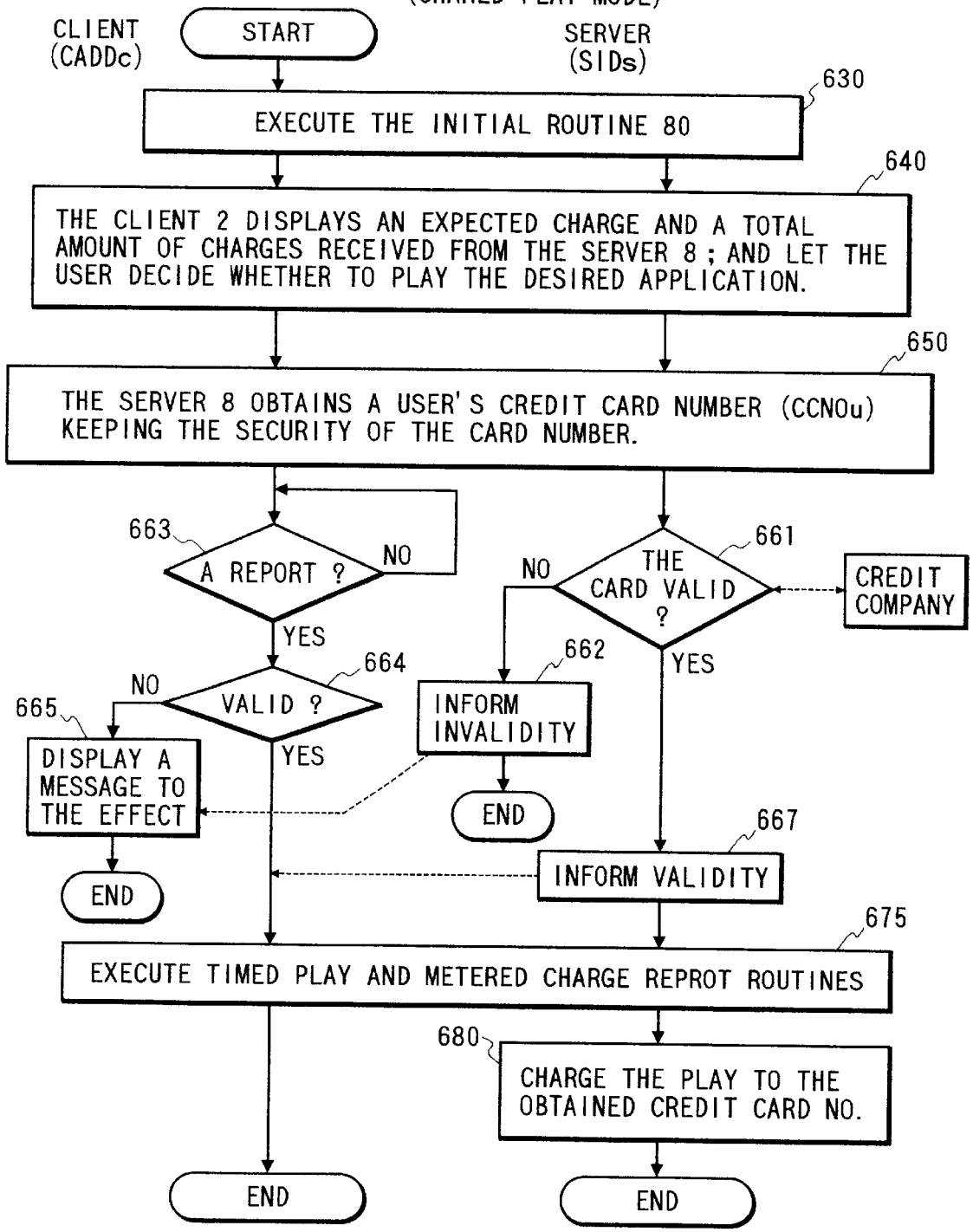

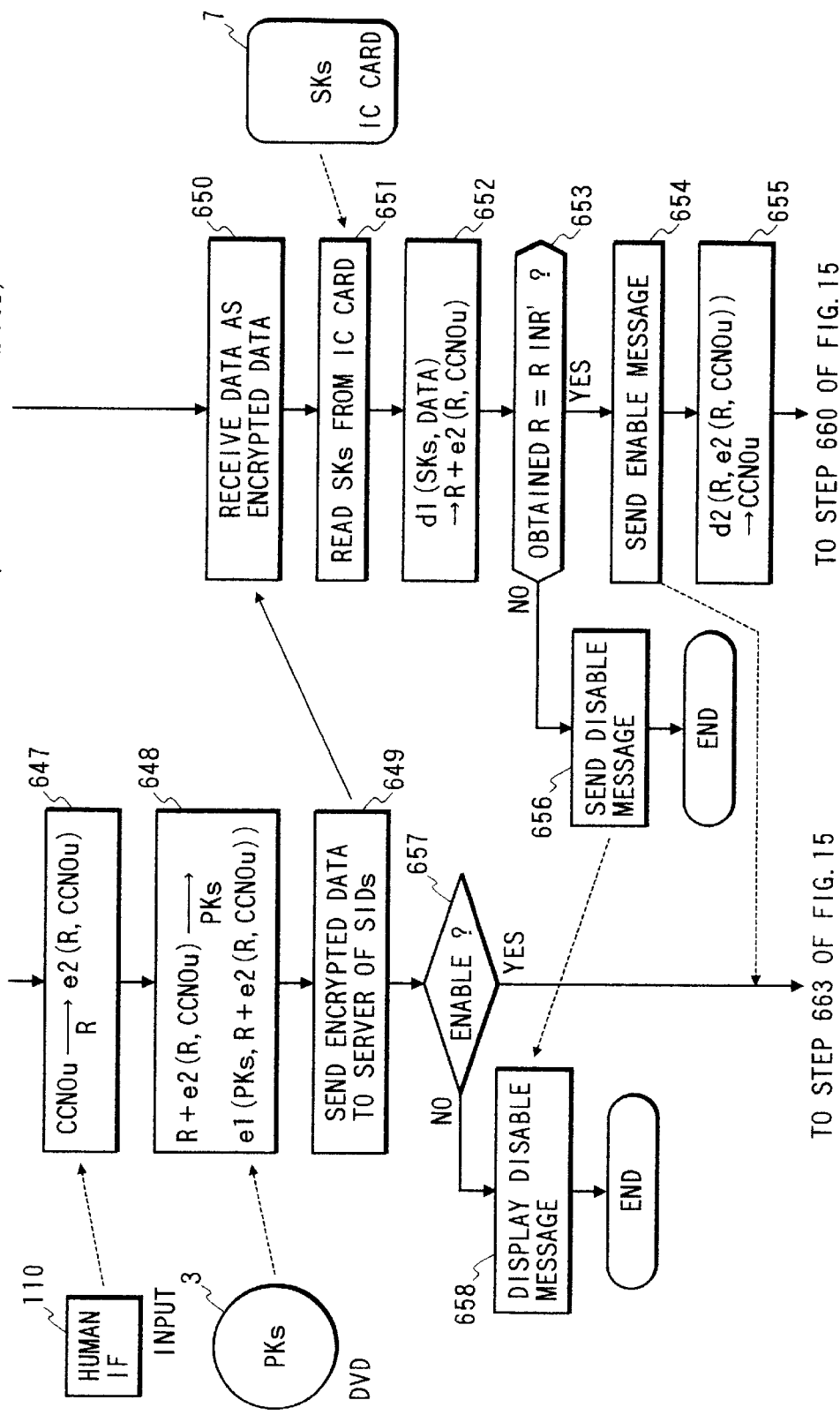

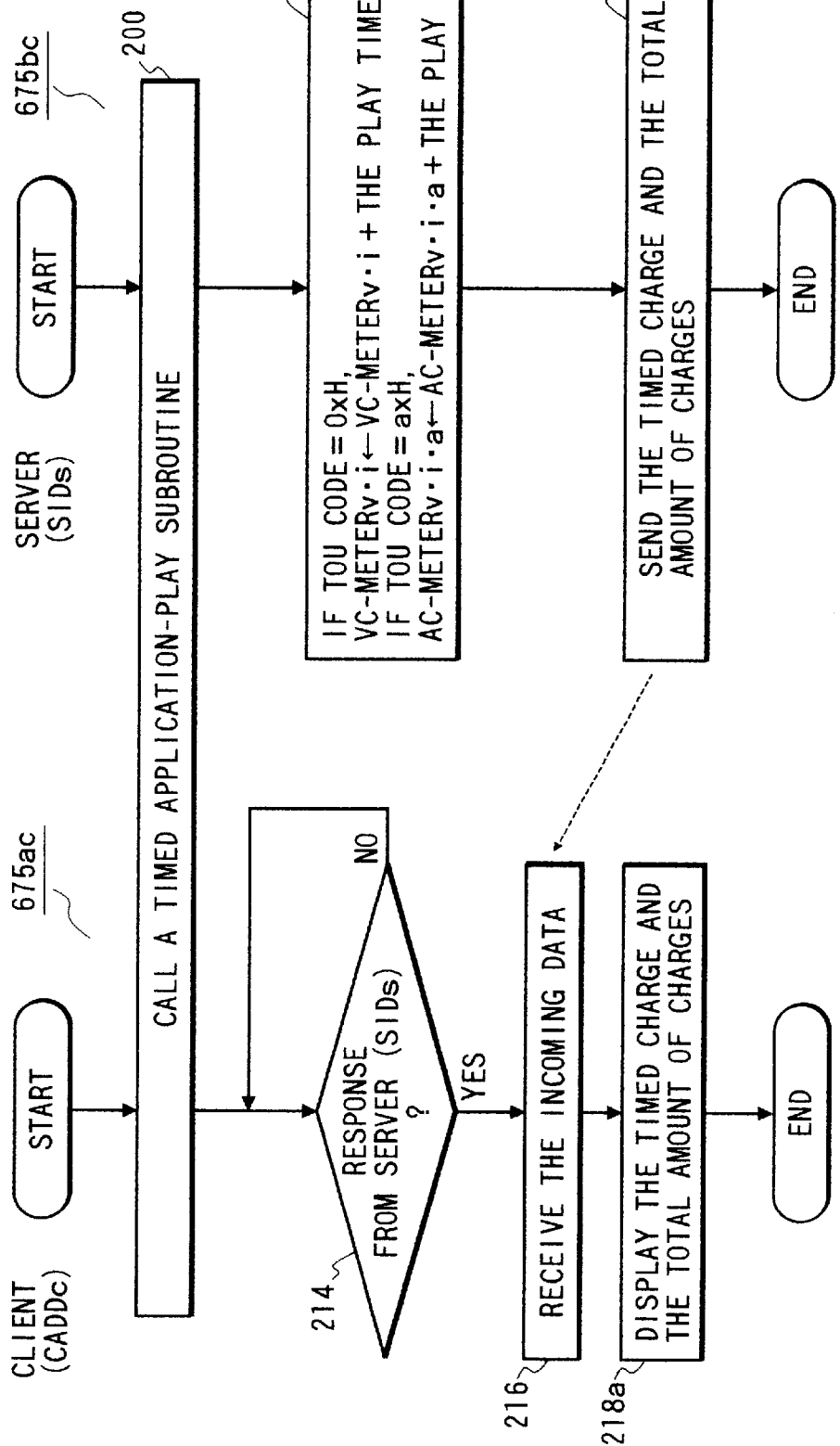

FIG. 23

| THE HIGHER DIGIT OF TERMS-OF-USE CODE (HEXADECIMAL) | THE TERMS-OF-USE CODE IS APPLIED TO: |
|---|---|
| 0 | THE ENTIRE VOLUME |
| 1 | APPLICATION 1 |
| 2 | APPLICATION 2 |
| ⋮ | ⋮ |

36

XYH (X, Y = 1, 2, ⋯, F)

| THE LOWER DIGIT OF TERMS-OF-USE CODE (HEXADECIMAL) | CORRESPONDING LIMIT VALUE | |
|---|---|---|
| 0 | NONE | (FREE) |
| 1 | NONE | (CHARGED) |
| 2 | THE EFFECTIVE DATE AND TIME | |
| 3 | THE ALLOWABLE EXPIRATION DATE AND TIME | |
| 4 | THE MAXIMUM AMOUNT OF USED PERIOD | |
| 5 | THE ALLOWABLE ACCESS COUNT | |
| ⋮ | ⋮ | |

37

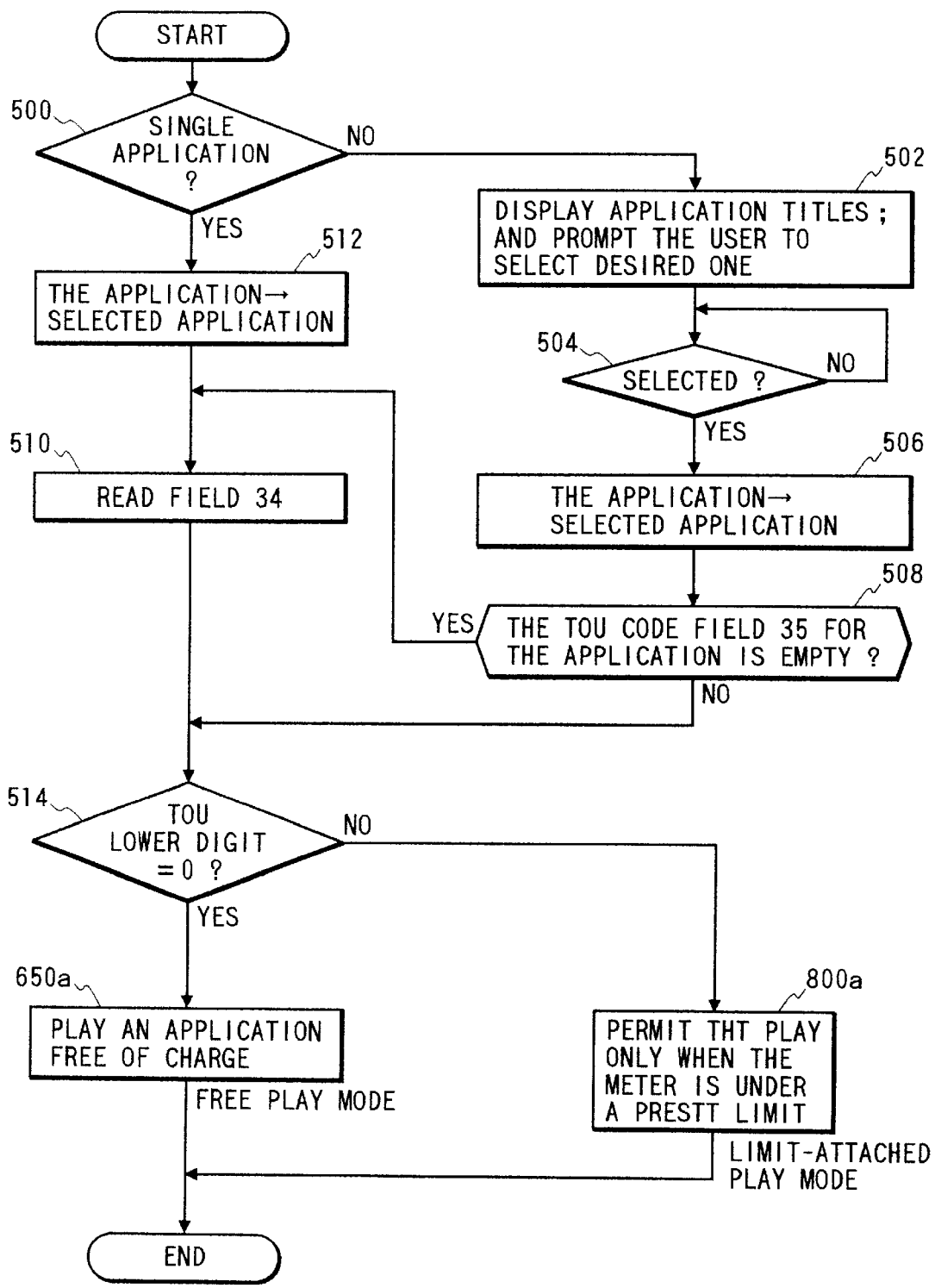

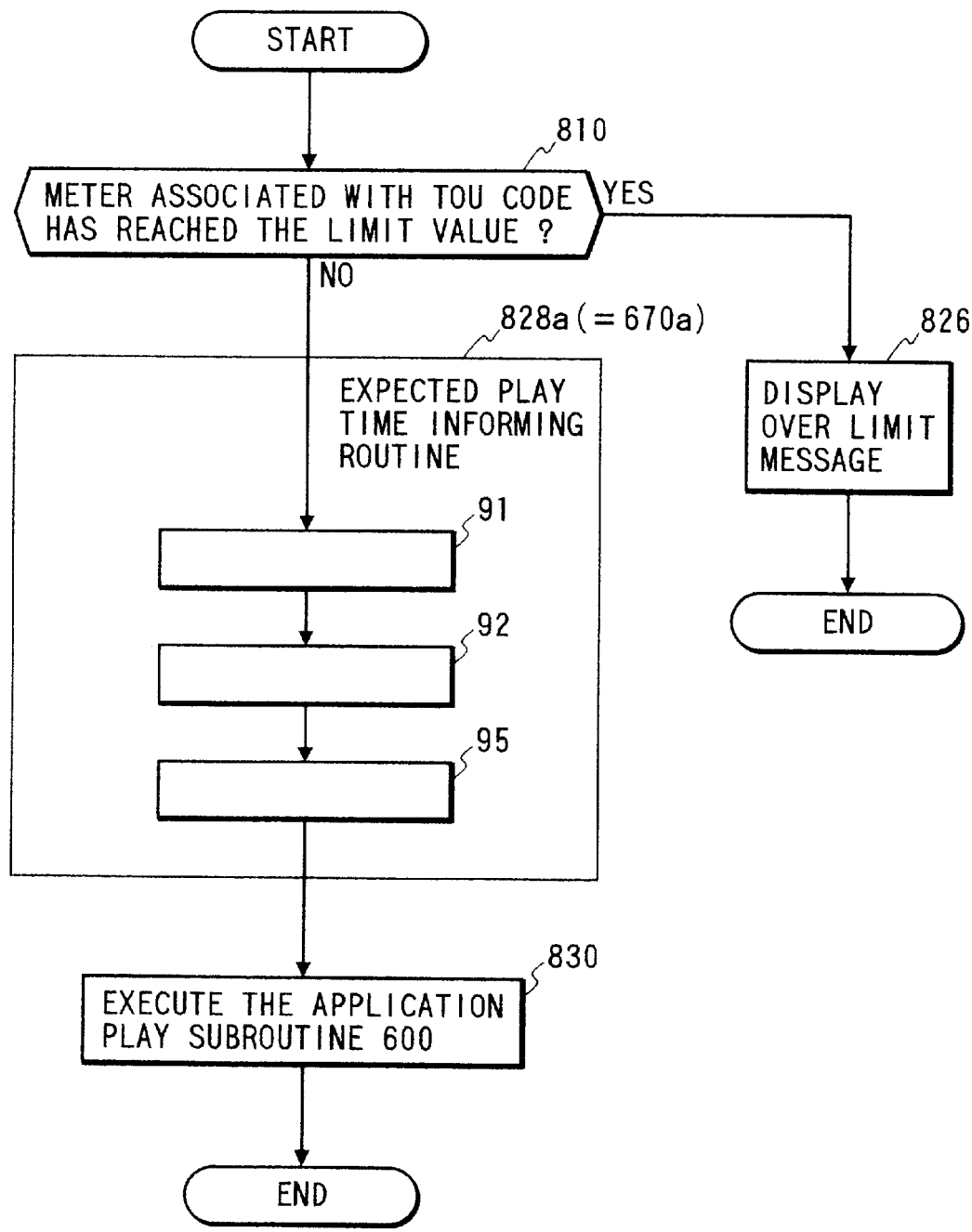

APPLICATION PACKAGE AND SYSTEM FOR PERMITTING A USER TO USE DISTRIBUTED APPLICATION PACKAGE ON THE TERM OF THE USE THEREOF

BACKGROUND OF THE INVENTION

1. Field of the Invention

The invention generally relates to a security system and, more specifically, to a method and system for permitting an authentic user to use charged information which has been distributed via package or transmission media while charging and controlling the use of distributed charged information.

2. Description of the Prior Art

In order to use charged information such as music, movies, games, etc. provided by information providers that provide various programs of such charged information, a user has generally to take two steps. In the first step (or obtaining step), the user obtains a desired program from one of the information providers by purchasing a package media such as an FD (floppy disc), an optical disc (e.g., CD-ROM (compact disc read only memory) and DVD (digital versatile disc or video disc)), etc. on which the desired program is recorded (off-line distribution or obtaining) or by down loading the desired program from the server computer of an information provider through a predetermined procedure (on-line distribution or obtaining). In case of the on-line obtaining, the user may either play the program while obtaining it (i.e., the two steps are executed in parallel) or store the program while obtaining it in the first step and execute the program later as the second step (or using step). In case of the off-line obtaining, in the second step the user loads the obtained recording media into an appropriate device and directly plays (or executes) the program or once stores the program into the memory of the device and then plays the program, Japanese Patent unexamined publication No. Hei7-295674 (1995) discloses a security system for use in the second or using step for a CD-ROM. In this system, the user can use encrypted information which is recorded together with a public key of a toll center (a center public key) on a CD-ROM by encrypting with the center public key and sending a code of desired program included in the information and a user-generated key to the information provider and by decrypting the information with an encryption key which has been encrypted with the user-generated key and sent by the information provider. However, the identity of the user is not verified, permitting a mala fide user who have obtained other person's CD-ROM to use it. Further, the center public key is pressed together with the encrypted information on the CD-ROM. This makes it difficult to change the center public key. Also, this causes different providers who probably want to use different center public keys to force the CD-ROM manufacturer to use different masters (or stampers) in pressing the CD-ROMs.

Japanese Patent unexamined publication No. Hei7-288519 (1995) discloses a security system for use in b6th the first and second steps. However, this system is only applicable to a system in which charged information is distributed on line.

Japanese Patent unexamined publication No. Hei8-54951 (1996) discloses a system in which the quantity of used software is monitored, and further software use by the user is impeded if the quantity exceeds a predetermined quantity. Since a dedicated hardware is necessary for impeding of software use, this system is only suitable for the use in a server in a on-line distribution system.

There is also a system for permitting a user to use, only for a trial period, software which has been distributed with data defining the trial period. In this system, a mala fide user may make the software reusable by installing the software again or setting the user system clock for a past time.

There are these and other programs in the art. It is an object of the invention to provide a system for permitting only an authentic user (a user who have legally obtained charged information either on line or off line from an information provider) to use the charged information without any limitation, charging for each time of its use, or within the tolerance of a use-limiting factor (e.g., the quantity used, the days elapsed since the day of its purchase or the current date) according to the type of the charged information.

SUMMARY OF THE INVENTION

According to the principles of the invention, it is assumed that charged information or an application package is distributed, either via package (or recording) media or via transmission media, together with at least control information such as a media title and a media code, etc. However, an illustrative embodiment will be described mainly in conjunction with charged information recorded on and distributed by means of the DVD.

For any type of charged information, charged information has been encrypted with a key and recorded on a DVD when obtained by a user. If distributed charged information to be played is of the limitlessly playable type, the charged information processing is achieved in the following way: the key is first obtained in a user public key-encrypted form from the DVD on which the key has been recorded at the time of selling the DVD; the user public key-encrypted key is decrypted with a user secret key stored in a IC card into a decrypted key; and the encrypted charged information is decrypted with the decrypted key and consumed (that is, played or executed). The user-public key-encrypted key may be obtained on line from the server serving the client (device).

If distributed charged information to be played is of the usage-sensitive charging type, the user is charged for each time of using the information. In this case, prior to processing the charged information, the client double-encrypts and sends a user's credit card number to one of the toll servers of the provider of the information; the server adds an amount (e.g., play time or duration) used associated with the Information to the value in a total amount (software meter) field in a volume data table, and sends the updated total amount value to the client; and the client displays the updated total amount. Then the client starts the charged information processing.

If distributed charged information to be played is of the limit-attached type, that is, the use of the information is to be limited by the tolerance of a certain limiting factor concerning the information consumption, then the client is permitted to consume the charged information only if the use-limiting factor is within the preset limit. In case of this type of charged information, prior to processing the charged information, the client sends the identifier (ID) code of a user specified application which is recorded on the DVD to the server; on receiving the ID code the sever tests if the use-limiting factor associated with the user specified application is within the preset limit; if not, then the server informs the client of the test result, and the client displays the test result; if the test was successful, then the server updates the meter (or integrated value) of the use-limiting factor and sends the updated value to the client; and in response to the reception of the updated value the client displays the updated value. Then the client starts the charged information processing.

BRIEF DESCRIPTION OF THE DRAWING

Further objects and advantages of the present invention will be apparent from the following description of the preferred embodiments of the invention as illustrated in the accompanying drawings. In the drawing.

FIG. 6A is a diagram showing an exemplary structure of a volume data table stored in a server shown in FIG. 1;

FIG. 6B is a diagram showing an exemplary structure of a application data table stored in a server 8;

FIG. 7 is a diagram showing a structure of a server table 75 stored in the EEPROM 103 of the client 2;

FIGS. 8A and 8B are flow charts of initial routines executed interactively by the client 2 and the server 8, respectively, at the beginning of the processes 650, 700 and 800.

FIG. 9 is a flow chart showing a procedure of a free play process shown as step 650 in FIG. 5, wherein connecting adjacent blocks by two flow lines indicates that each block is executed interactively by a client and an associated server;

FIGS. 10A and 10B are flow charts jointly showing a procedure formed of exemplary expected play time informing routines interactively executed;

FIGS. 11A and 11B are flow charts jointly showing a procedure formed of exemplary timed play and metered usage report routines Interactively executed for playing an application while timing the duration and displaying a timed play duration after the play;

FIGS. 12A and 12B are flow charts jointly showing a procedure formed of exemplary timed application-play subroutines interactively executed for playing the application while timing the duration;

FIGS. 13A and 13B are flow charts jointly showing a procedure formed of alternative timed application-play subroutines Interactively executed in which timing of play time is achieved with a timer in the client;

FIG. 14 is a flow chart of an exemplary application play subroutine called in steps 612 and 622 of FIGS. 12A and 13A, respectively, and executed by the controller 100;

FIG. 15 is a flow chart showing a procedure of a charged play process 700 shown as 700 in FIG. 5, FIGS. 16A and 16B are flow charts jointly showing a procedure formed of exemplary expected charge informing routines interactively executed;

FIGS. 17A and 17B are flow charts jointly showing a procedure formed of routines interactively executed in block 650 of FIG. 15;

FIGS. 18A and 18B are flow charts jointly showing a procedure formed of exemplary timed play and metered charge report routines interactively executed for playing an application while timing the duration and displaying a charge and a total amount of charges after the play;

FIG. 23 is a diagram for explaining the meanings of the terms-of-use (TOU) codes and the corresponding limit values;

FIG. 25 is a flow chart schematically showing an exemplary control program executed by the controller 100a shown in FIG. 24;

FIG. 28 is a flow chart showing an operation of a limit-attached play mode shown in step 800a of FIG. 25,

DETAILED DESCRIPTION OF THE PREFERRED EMBODIMENTS

For the sake of better understanding of the following description, it will be useful to define some terms to be used.

Charged information provided by an information provider may be distributed off-line (in off-line distribution) or on-line (in on-line distribution). In off-line distribution, the charged information is recorded on package media or recording media, and distributed through the sales network of the provider, that is, sold at stores in the sales network. The package media include all sorts of portable recording media such as various types of magnetic discs, a variety of optical memory discs (e.g., CD, CD-ROM, DVD), and magnetic tapes and cartridges. In on-line distribution, the charged information is transmitted via transmission media from the servers at the service points of the provider and the distributors aligned with the provider to the client device (e.g., PC (personal computer)) of the user who requested the charged information, and stored in a recording media of the client (device). The transmission media include any telecommunication channels which permit data communication between the servers and the client device. The package media and the transmission media are hereinafter referred to en bloc as "distribution media".

The charged information may be any type of software such as music, movies, games, etc. which are each referred to as an "application" without discrimination. The distribution unit of charged information is referred to as a "charged information package" or an "application package". There may be included one or more applications in an application package.

The present invention relates to a system for permitting a user to use a distributed application package on the terms of use of the package with a higher security.

Embodiment I

For the purpose of simplicity, a first illustrative embodiment will be described in which package media, among other things, DVDs are used as distribution media.

Figure 1:
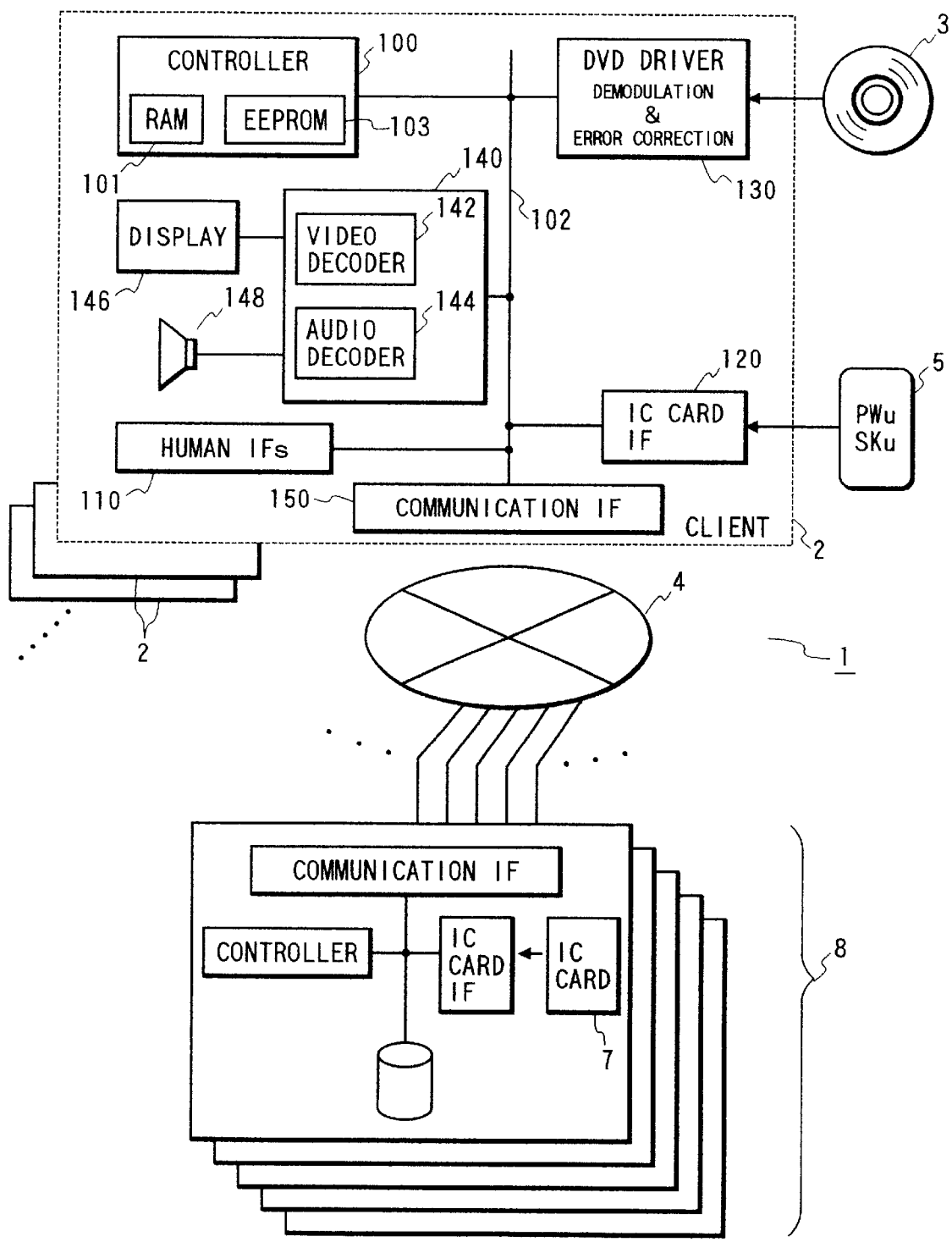
FIG. 1 is a block diagram showing an arrangement of a system for permitting a user to use a distributed application package on the terms of use of the package with a higher security according to a first illustrative embodiment of the invention.

FIG. 1 is a block diagram showing an arrangement of a system for permitting a user to use the applications) recorded on a DVD on the terms of use of the DVD with a higher security according to the first illustrative embodiment of the invention. In FIG. 1, the system 1 comprises a client or DVD player 2 which plays a DVD 3, a telecommunication network 4, and a server 8 at a toll center of the provider 6 which provides the application package of the DVD 3.

Figure 2:
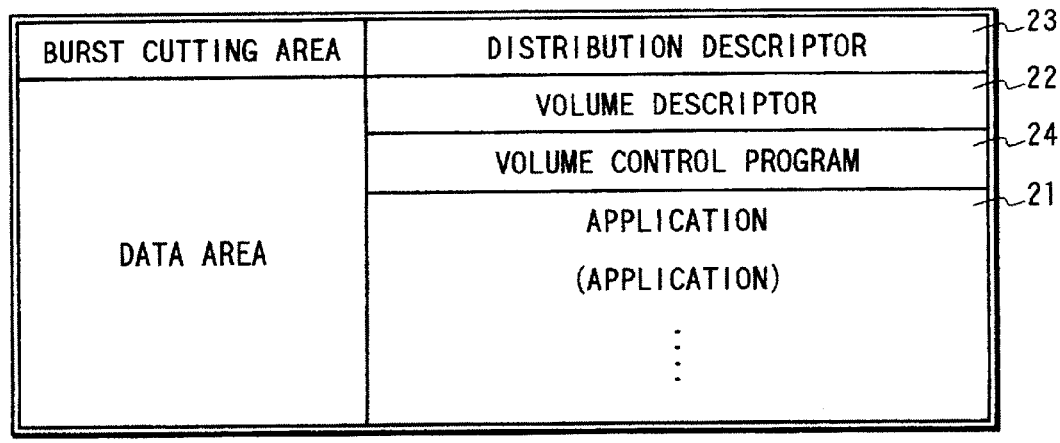
FIG. 2 is a diagram showing an exemplary structure of an application (or a charged information) package recorded on a DVD used in the inventive system.

FIG. 2 is a diagram showing an exemplary structure of an application (or a charged information) package 20 recorded on the DVD 3 used in the inventive system 1. In FIG. 2, the application package 20 comprises at least one application 21, a volume (or package) descriptor 22 comprising data concerning the application package 20, and a distribution descriptor 23 comprising data which is determined mainly at the time of, e.g., distribution or sales after the pressing of the DVD 3. (The volume descriptor 22 and the distribution descriptor 23 constitutes the volume control data of the volume 20.) In this embodiment it is assumed that a volume (or package) control program which controls the use of the application package 20 in cooperation with the server 8 is included in and distributed with the application package 20. Thus, the application package 20 further comprises the package control program 24 suited for the terms of use of the package 20. The applications) 21, the volume descriptor 22 and the package (or volume) control program 24 are recorded in the data area of the DVD 3 at the time of manufacturing the DVD 3, while the distribution descriptor 23 is recorded in the burst cutting area at the time of, e.g., sales of the DVD 3.

Figure 3:
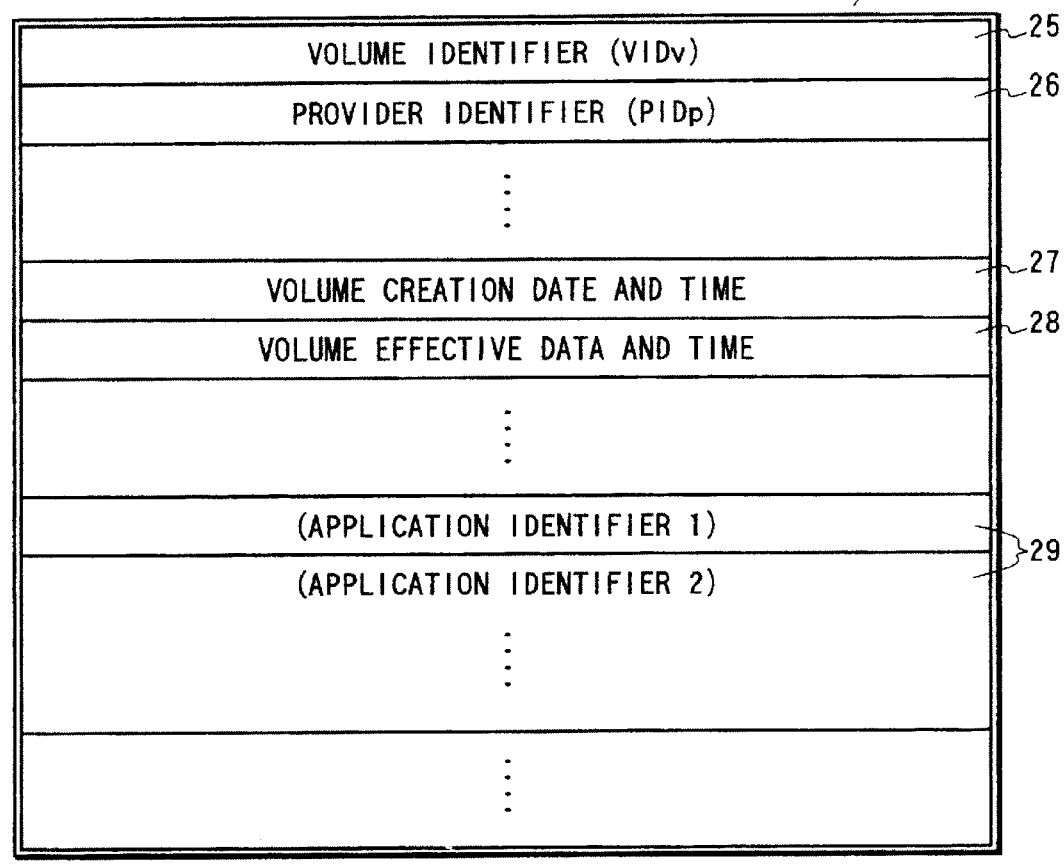
FIGS. 3 and 4 are diagrams showing, in a detailed form, exemplary data structures of the volume descriptor 22 and the distribution descriptor 23, respectively.
Figure 4:
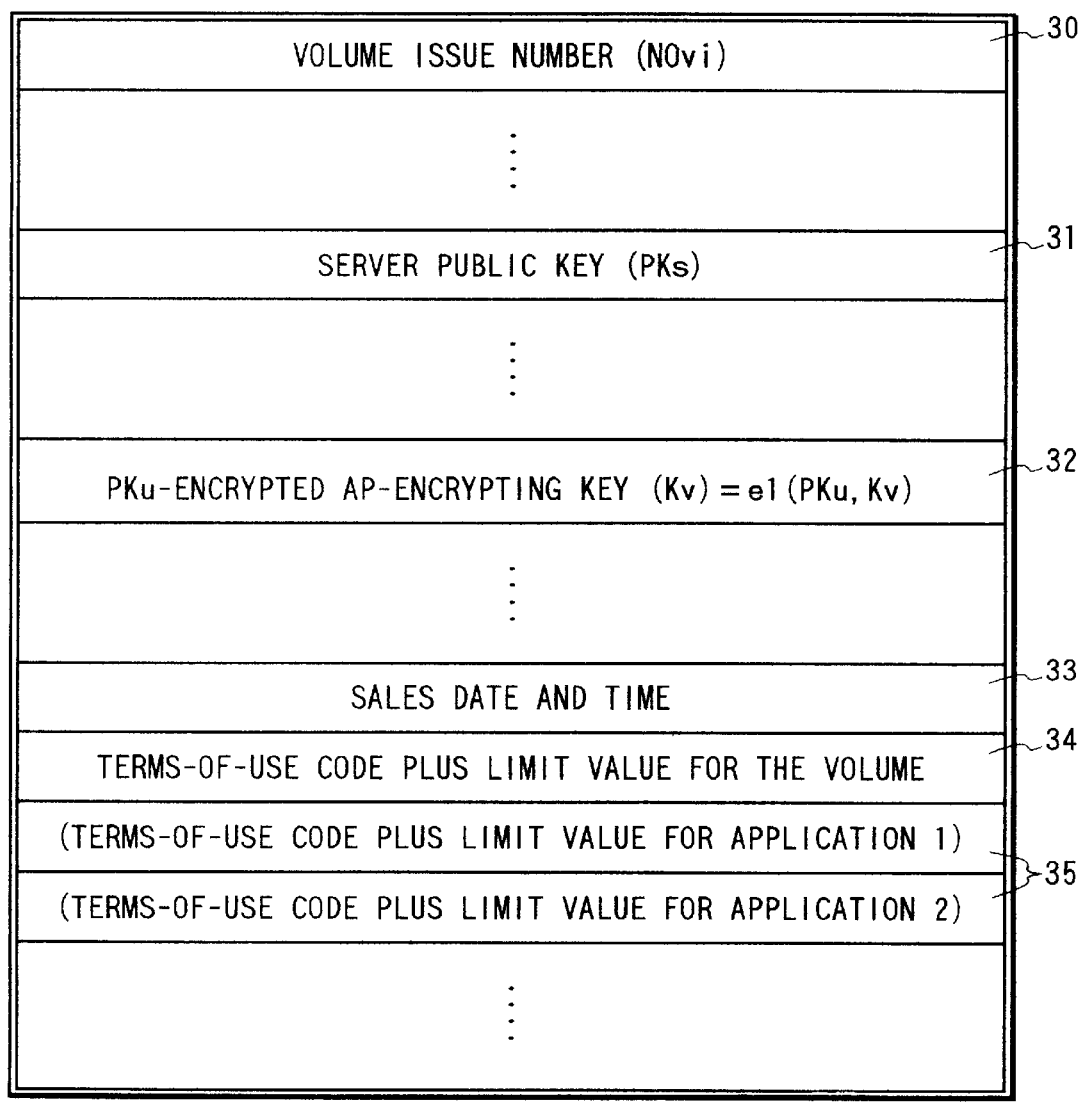

FIGS. 3 and 4 are diagrams showing, in a detailed form, exemplary data structures of the volume descriptor 22 and the distribution descriptor 23, respectively. In FIG. 3, the volume descriptor 22 at least contains a volume identifier (VID$_v$) 25 which the title of the application package 20 is probably used for and which is the same as the application identifier if the package or volume 20 contains only one application; a provider identifier 26; volume creation date and time 27 which may be used for the base point by which volume expiration data and time as described later is determined; and volume effective date and time 28 indicative of date and time until which the volume 20 is available. If the volume 20 contains more than one applications, the volume descriptor 22 further contains application identifiers (AID$_a$'s) 29.

In FIG. 4, the distribution descriptor 23 comprises the fields of: a volume issue number (NO$_{v-i}$) 30 which contains a serial number given to each of the distributed application packages of an identical volume identifier (volume ID or title) VID$_v$ in the order of distribution; a server public key (PK$_s$) 31 the data of which is given by the server 6 at a toll center of the provider 6; a PK$_u$(user-public-key)-encrypted application-encrypting key (K$_v$) 32; and sales date and time 33. The key PK$_s$ 31 field contains a key which has been used in encrypting each application 21 in the package 20 and which has been encrypted with a user public key (PK$_u$) of the user who has legally obtained the package 20. Appropriate data are recorded in all of the fields 30 through 34 at the time of distribution of the package 20, i.e., at the time of sales of the DVD 3 in this embodiment.

The distribution descriptor 23 further comprises the field 34 of terms-of-use code (mode code) plus limit value for the volume (the volume limit value field) and, for each of the application IDs 29, the fields 35 of terms-of-use code plus limit value for the application ID 29 (application limit value field). If terms of use are set only to the volume 20, there is no need of the field 35, If terms of use are set to each application, the field is empty.

FIG. 23 is a diagram for explaining the meanings of the terms-of-use (TOU) codes and the corresponding limit values. In FIG. 23, the terms-of-use code may be, e.g., one byte in length. The higher digit (X) of the TOU code indicates the target to which the terms of use is applied as shown in table 36. That is, higher digits of 0, 1, 2, . . . indicate that the TOU codes beginning with those digits are for the entire volume, application 1, application 2 and so on. The lower digit (Y) of the above mentioned terms-of-use code indicates of the terms of use of the package 20 or the application 21 to which the code is set, and is directly followed by a corresponding limit value as shown in table 37 of FIG. 23, Specifically, the terms-of-use code (or TOU code) of 00H means, for example, that the volume 20 is usable freely after distribution. The value '31H' means, for example, that the application 3 to which the TOU code is set can be used by paying per unit of play duration. The lower digit of 2H or more means that the volume 20 or the application to which the TOU code is set can be used freely until the corresponding limit value are reached, which disables further use. As seen from the table, the use-limiting factors determined by the TOU codes whose lower digits are 2H to 5H are the current date and time, the expiration date and time, the amount of used period, and the access count, respectively.

Since the data of the distribution descriptor 23 can be set as described above, this provides both the providers and the users with more flexibility than conventional system can provide.

Again in FIG. 1, the DVD player 2 comprises a controller 100 for controlling the entire DVD player 2; data bus 102 connected with the not-shown CPU (central processing unit), not-shown ROM (read-only memory), RAM (random access memory) 101, and EEPROM (electrically erasable programmable ROM) 103 included in the controller 100; human interfaces (IFs) 110 including input devices such as a keyboard, a voice recognition device, a mouse, a remote controller, etc.; an IC card interface (IF) 120 for connecting the bus 102 with the ROM (not shown) in a IC card 5; a DVD driver 130 for reading out the data recorded on the DVD 3 and for demodulating and error-correcting the read data; a video and audio output IF 140 for receiving a MPEG 2 bit stream and outputting a video and audio output signals; a display device 146; a loudspeaker 148, and a communication IF 150 for communicating through the public telecommunication network 4. The IC card 5 stores a user's password PW$_u$ and a user's secret key SK$_u$ which corresponds to the user's public key PK$_u$ mentioned in conjunction with the PK$_u$-encrypted AP-encrypting key (K$_v$) contained in the field 32 of the distribution descriptor 23 recorded in the burst cutting area of the DVD 3. The video and audio output IF 140 includes a MPEG 2 video decoder 142 and a MPEG 2 audio decoder 144.

As for obtaining the DVD 3, there may be some ways. If one is to buy a DVD 3, e.g., at some book store or through mail order, he or she has to have the $PK_u$-encrypted version of an application-encrypting key ($K_v$) recorded in the burst cutting area of the desired DVD 3 by notifying his or her public key $PK_u$ which corresponds to his or her secret key $SK_u$ stored in the IC card 5. If one is a member of a DVD distribution service, he or she can obtain a DVD with a $PK_u$-encrypted AP-encrypting key recorded without notifying the $PK_u$ each time of obtaining because he or she must have notified the $PK_u$ when he or she applied for the service.

In operation, the user first sets a desired DVD 3 in the DVD driver 130 of the DVD player 2, and issues a start command to the DVD player 2 through an appropriate human IF 110. In response to a receipt of the start command, the controller 100 reads the volume control program 24 from the data area of the DVD 3 through the DVD driver 130 while loading the read program 24 into the RAM 101 of the controller 100, and then executes the volume control program 24.

Figure 5:
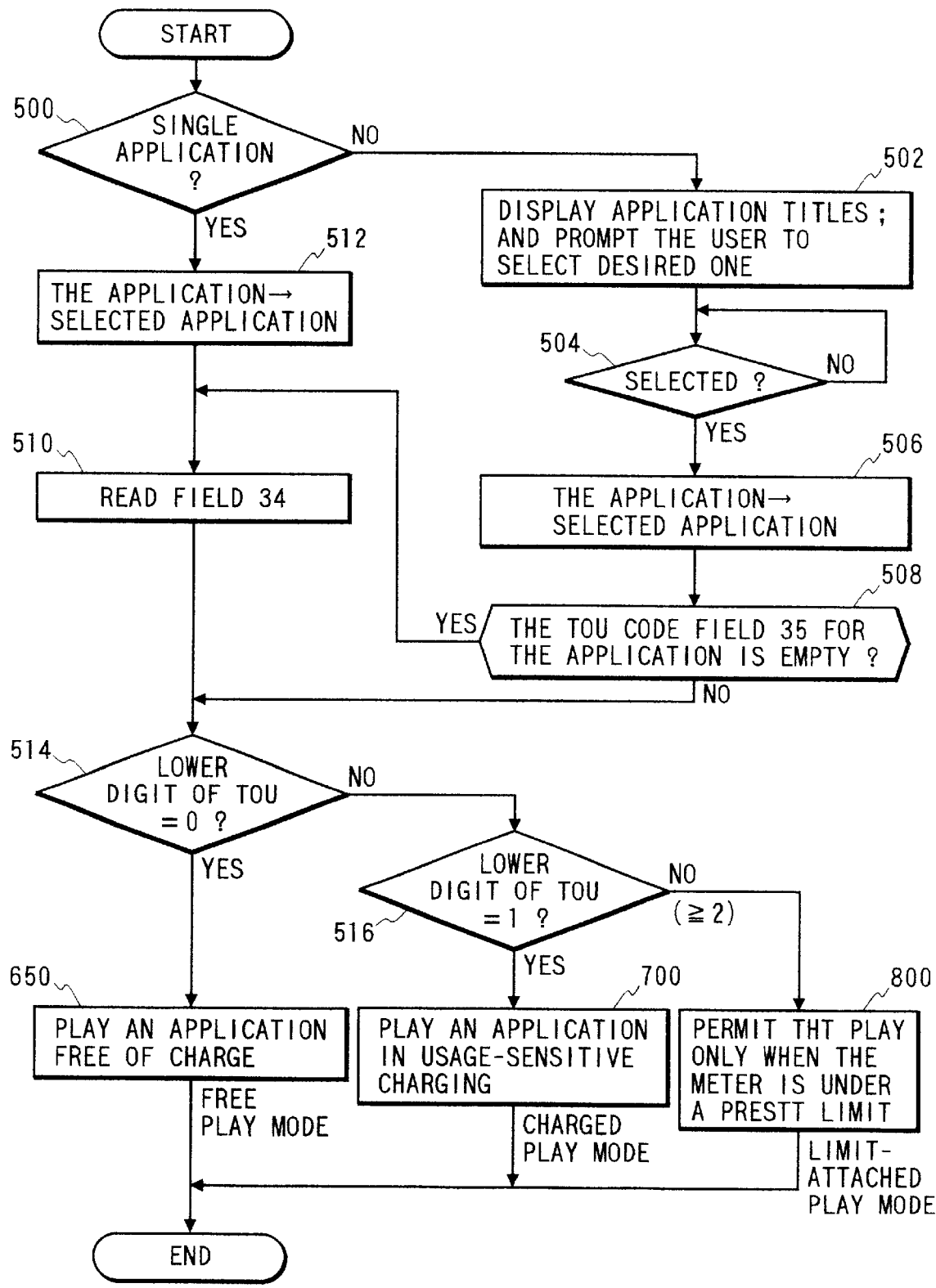
FIG. 5 is a flow chart of a volume control program for playing the application(s) recorded on the DVD according to the principle of the invention.

FIG. 5 is a flow chart of the volume control program 24 for playing the application(s) 21 recorded on the DVD 3 according to the principle of the invention. In FIG. 5, the controller 100 first checks the AID1 field to see if the volume 20 contains a single application in step 500. If not, then the controller 100 displays the application IDs in the field 29 and prompts the user to select a desired one of the applications in step 502, and waits for the selection in step 504. If any application is selected in step 504, the controller 100 registers the application ID of the application as the application to be played in step 506 and proceeds to step 508 to check the field 35 of the terms-of-use (TOU) code plus limit value for the selected application to see if the field is empty. If so, the controller 100 proceeds to step 510 to read the volume limit field 34.

On the other hand, if the test result is YES in step 500, then the controller 100 registers the volume ID as the application to be played in step 512, and reads the volume limit value 34 in step 510.

If the step 510 is completed or the test result of step 508 is NO, then the controller 100 checks the terms-of-use (TOU) code to see if the lower digit of the TOU code is 0 in step 514. If so, then the controller 100 plays an application free of charge in step 650, and otherwise makes another check to see if the lower digit of the TOU code is 1 in step 516. if so, the controller 100 plays an application in a usage-sensitive charging in step 700, and otherwise (if the lower digit of the TOU code is 2 or more) play an application only when the software meter of a use-limiting factor is under a preset value in step 800. On completing any of the steps or processes 650 through 800, the controller 100 ends the program 24. Thus, the DVD player 2 plays a program specified by the user according to the terms of use determined by the TOU code which has been set to either the application package or the specified application.

The processes 650, 700 and 800 are executed interactively with an associated server 8. The servers 8 need various data for executing these processes, and store such data in the form of tables.

FIG. 6A is a diagram showing an exemplary structure of a volume data table stored in a server 8. In FIG. 6A, Each of the records of the volume data table 60 comprises volume ID ($VID_v$) and issue No. ($NO_{v-i}$) fields. The combination of $VID_v$ and $NO_{v-i}$ serves as the user ID of the user of the application package 20 or the DVD 3. For this reason, the table 60 has, for the members or subscribers of DVD distribution service or the like, personal data fields which contains, for example, a member ID, a name, an address, etc. Each record further comprises a volume minute meter field ($VM-METER_{v-i}$) containing a software meter of play duration in minute which is attached to (or associated with) the volume 20; a volume charge meter ($VC-METER_{v-i}$) containing a software charge meter which is attached to the volume 20; a limit value ($LV_{v-i}$) containing a limit value associated with the TOU code (e.g., the effective date and time, the allowable expiration date and time, the allowable access, etc.); a limit value meter ($LV-METER_{v-i}$); an application ID ($AID_{v-i-a}$) field containing the title of the application; an application minute meter ($AM-METER_{v-i-a}$) field containing a software meter of play duration in minute which is attached to the application of $AID_{v-i-a}$; an application charge meter ($AC-METER_{v-i-a}$) field for a software meter of play duration in minute which is attached to the application of $AID_{v-i-a}$; a limit value ($LV_{v-i-a}$) containing a limit value associated with the TOU code; and a limit value meter ($LV-METER_{v-i}$).

FIG. 6B is a diagram showing an exemplary structure of a application data table stored in a server 8. In FIG. 6B, the application data table 70 comprises the fields of, for example, an application code ($ACODE_n$), an application title ($AID_n$), a duration (D), a rate-per-access (RATE/ACCESS), an access count, a minute meter, etc. The duration is a period of time what it takes to play the application. The rate per access is a charge for a play of the whole application, which is used for informing the user of an expected play duration prior to a play. The rate per unit time is a charge for a unit time of play, which is used for the calculation of a charge for an actually timed play duration. The access count and minute meter fields contains the number of accesses to the application and a total amount of play time, which are not necessary for the present invention but will be used in statistical calculations for the analysis of, e.g., the tastes.

FIG. 7 is a diagram showing a structure of a server table 75 stored in the EEPROM 103 of the client 2. In FIG. 7, the fields of the table 75 comprises a server public key ($PK_s$), a server ID ($SID_s$), a server network address ($SADD_s$), etc. this table 75 is used for associating the sever public key ($PK_s$) contained in the distribution descriptor 23 recorded in the burst cutting area of the DVD with the ID and the network address.

Play an Application Free of Charge

The initial routines of the processes 650, 700 and 800 are the same.

FIGS. 8A and 8B are flow charts of initial routines 80a and 80b which are executed interactively by the client 2 and the server 8, respectively, at the beginning of the processes 650, 700 and 800. In FIG. 8, the controller 100 of the client or the DVD 2, in step 82, sends a service request with the network address $CADD_c$ of the client or DVD 2, the TOU code plus limit value, the volume ID ($VID_v$), the issue number ($NO_{v-i}$), the application ID ($AID_{v-i-a}$), and other data to the associated server 8 the ID of which is $SID_s$ ($SID_s$ is obtained from the table 75 in FIG. 7 by using the public key recorded on the DVD 3), and in step 92 waits for a response from the server ($SID_s$) 8. If there is a response from the server ($SID_s$), the client 2 proceeds to the next step through a circle with "A" therein.

On the other hand, in FIG. 8B, the server 8 of $SID_s$ receives the message from the client 2, that is, the service request and the accompanying data and stores date in a predetermined location for subsequent use in step 84. Then, the server 8 searches the table 60 for a record which contains $VID_v$ and $NO_{v-i}$ in the volume ID and issue No. fields thereof, respectively in step 86. If the search is unsuccessful, then the server 8 adds the record for $VID_v$ and $NO_{v-i}$ and fills relevant fields with $AID_{v-i-a}$ and a limit value, if any, in the table 60 in step 88, and proceeds to step 90. Also, If the search in step 86 is successful, the server 9 proceeds to step 90, where the server 8 selects a routine to execute next according to the value of the TOU code and enters the selected routine through a circle with "B" therein. In this case, if the TOU code=x0H (x: an arbitrary HEX number, the letter H in the last position indicates that the preceding number is in hexadecimal), then a routine for playing an application free of charge is selected. If the TOU code=x1H, then a routine for playing an application in usage-sensitive charging Is selected. If the TOU code≧x2H, then a routine is selected which plays an application only if the software meter of a use-limiting factor is under a preset value.

FIG. 9 is a flow chart showing a procedure of a free play process shown as step 650 in FIG. 5, wherein connecting adjacent blocks by two flow lines indicates that each block is executed interactively by a client of $CADD_c$ and an associated server $SID_s$ as shown in detail later. If the TOU code is 0 in step 514 of FIG. 5, then the server ($CADD_c$) enters the free play process 650 as shown in FIG. 9, and the client and the server ($SID_s$) execute the initial routine 80 in block 660. In block 670, they executes an expected play time informing routine, that is, displays an expected play time before playing an specified application. In block 680, they execute an application play and metered play time report routine. Since the routine 80 has been detailed in FIG. 8, the expected play time informing routine and the application play and metered play time report routine will be detailed in the following.

FIGS. 10A and 10B are flow charts jointly showing a procedure formed of exemplary expected play time informing routines 97a and 97b interactively executed by the client 2 and the associated server 8, respectively. In FIG. 10B, the server 8 retrieves the duration ($D_n$) of the application of $AID_{v-i-a}$ from the table 70 in a well known manner in step 91. In the next step 92, the server 8 calculates an expected total amount of play time according to the value of the TOU code. Specifically, if the TOU code is 0xH, then the client adds the duration ($D_n$) and the value of the VM-METER$_{v-}$ ifield of the record identified by $VID_v$ and $NO_{v-i}$ in the table 60. If the TOU code is axH (a: the application number of the specified application in the volume), then the client adds the duration ($D_n$) and the value of the AM-METER$_{v-i-a}$ field of the record identified by $VID_v$, $NO_{v-i}$, and $AID_{v-i-a}$ in the table 60. Then the server 8 sends the result to the client whose network address is $CADD_c$ in step 93, and ends the process.

On the other hand in FIG. 10A, the client 2 receives the incoming message or the value of the updated meter in step 94. In the next step 95, the value is displayed as the total amount of usage. Then the client 2 ends the process.

In updating a relevant meter, a predetermined value of duration has been used in the just described routines of FIG. 10 (a preset value metering system). This arrangement is suited mainly for such applications as it takes a constant time to play, and will not cause a problem unless the user discontinues the play. From this point of view, it is preferable to actually measure the playing time in metering (a timed value metering system). However, it is also noted that the preset value metering system is useful in informing the user of expected play time prior to an actual playing.

FIGS. 11A and 11B are flow charts jointly showing a procedure formed of exemplary timed play and metered usage report routines 675a and 675b interactively executed by the client and the server, respectively, for playing an application while timing the duration and displaying a timed play duration after the play. In the routine 675, the client and the server call a timed application-play subroutine for playing the application while timing the duration (play time) in step 200. Then the server 8 proceeds to step 210, where the client updates a relevant meter according to the TOU code in the same manner as in step 92 of FIG. 10B. Specifically, if the TOU code is 0xH, then the play time is added to the value of the VM-METER$_{v-i}$ field of the record identified by $VID_v$ and $NO_{v-i}$ in the table 60. If the TOU code is axH (a: the application number of the specified application in the volume), then the play time is added to the value of the AM-METER$_{v-i-a}$ field of the record lidentified by $VID_v$, $NO_{v-i}$, and $AID_{v-i-a}$ in the table 60. Then the server 8 sends the play time and the value of the updated meter (i.e., the total amount of play time) to the client whose network address is $CADD_c$ in step 212, and ends the process.

On the other hand, the client 2, after step 200, make a test to see if there is a response from the server of $SID_s$ in step 214. This step is repeated until the client 2 receives a call from the server 8, when the client 2 receives the incoming message or the value of the updated meter in step 216. In the next step 218, the client 2 displays the play time and the total amount of play time, and then ends the routine 675.

FIGS. 12A and 12B are flow charts jointly showing a procedure formed of exemplary timed application-play subroutines 205a and 205b executed by the client 2 and the server 8, respectively, for playing the application while timing the duration. The server 8 of $SID_s$ waits for a notice in step 611 to see if the client has started playing the application. On the other hand, the client 2 of $CADD_c$ informs the server of a start of play in step 610 and immediately call an application play subroutine in step 612. This, causes the server 8 to start a timer in step 613, and waits for a notice of a stop of play from the client 2 in step 615. On completing the step 612, the client informs the server 8 of the stop of play in step 614. In response to this notice, the server 8 stops and reads the timer as the play time in step 617. After steps 614 and 617, the client and the server return.

Though the above described arrangement has used a timer of the server, it may be possible to use a timer of the client.

FIGS. 13A and 13B are flow charts jointly showing a procedure formed of alternative timed application-play subroutines 205ac and 205bc interactively executed by the client 2 and the server 8, respectively, in which timing of play time is achieved with a timer in the client. In the alterative subroutine 205a, the client 2 starts a timer in step 620, calls an application play routine in step 622, stops the timer in step 624, sends the play time to the server 8 in step 626, and then returns. On the other hand, the server 8, on entering the subroutine 295b, waits for a call from the client of $CADD_c$ in step 621. If there is a call from the client 2, then the server 8 receives the play time in step 623 and then returns.

However, the arrangement of FIG. 13 has a possibility of permitting a mala fide user to manipulate the timer of the client 2. From this point of view, the arrangement shown in FIG. 12 is preferable to that of FIG. 13.

FIG. 14 is a flow chart of an exemplary application play subroutine called in steps 612 and 622 of FIGS. 12A and 13A, respectively, and executed by the controller 100.

Prior to the description of the flow chart, we define some notation concerning encryption and decryption. If encrypting X with a key EK according to an encrypting algorithm e yields Y, then it is expressed as:

e(EK, X)=Y.

Similarly, if decrypting Y with a key DK according to a decrypting algorithm d yields Z, then it is expressed as:

d(DK, Y)=Z.

Assuming that the algorithms e and d and the keys EK and DK correspond each other, that is, d(DK, Y)=X, it follows that d (DK, e(EK, X))=X.

Returning now to FIG. 14, the controller 100 read the $PK_u$-encrypted application-encrypting (AP-encrypting) key ($K_v$) or e1 ($PK_u$, $K_v$) from the filed 32 of the distribution descriptor 23 of the DVD in step 602. Here, v=1, 2, ... V, where V is the number of kinds of the application package. This indicates that different application-encrypting keys K1 through $K_v$ is assigned to respective kinds of applications, that is, volume VID1 through $VID_v$.

In the next step 604, the user secret key $SK_u$ is read from the IC card 5. In the next step 606, the $PK_u$-encrypted AP-encrypting key e1($PK_u$, $K_v$) is decrypted with the user secret key $SK_u$ to obtain the application encrypting key $K_v$. Then in the next step 608, the $K_v$-encrypted application (AP), i.e., e($K_v$, AP) which is recorded on the DVD 3 is decrypted with the obtained AP-encrypting key $K_v$ to obtain d($K_v$, e($K_v$, AP))=AP, while passing the obtained application data to the video and audio output IF 140. The obtained application data has the form of an MPEG 2 bit stream. The video and audio output IF 140 converts the MPEG 2 bit stream of the application data into video and audio output signals through MPEG 2 video and audio decoding. The video and audio output signals are applied to the display device 146 and the loudspeaker 148, respectively. ps Play an Application in Usage-sensitive Charging system FIG. 15 is a flow chart showing a procedure of a charged play process 700 shown as step 700 in FIG. 5, wherein connecting adjacent blocks by two flow lines indicates that each block is executed interactively by a client of $CADD_c$ and an associated server of $SID_s$. In FIG. 15, the client 2 enters the process 700 via step 516 of FIG. 5 and proceeds to block 630, where the client 2 and the associated server 8 execute the initial routine 80. In the next block 640, the client 2 displays an expected charge and a total amount of charges received from the server 8, and let the user decide whether to play the desired application.

Figure 16B:
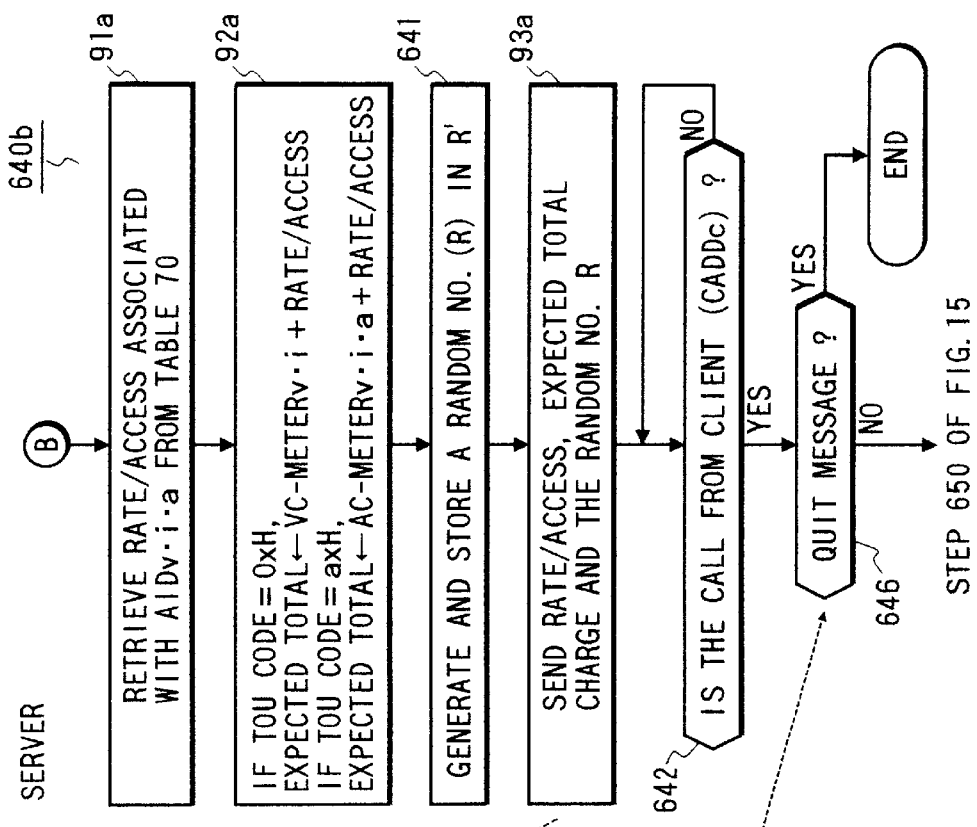
Figure 16A:
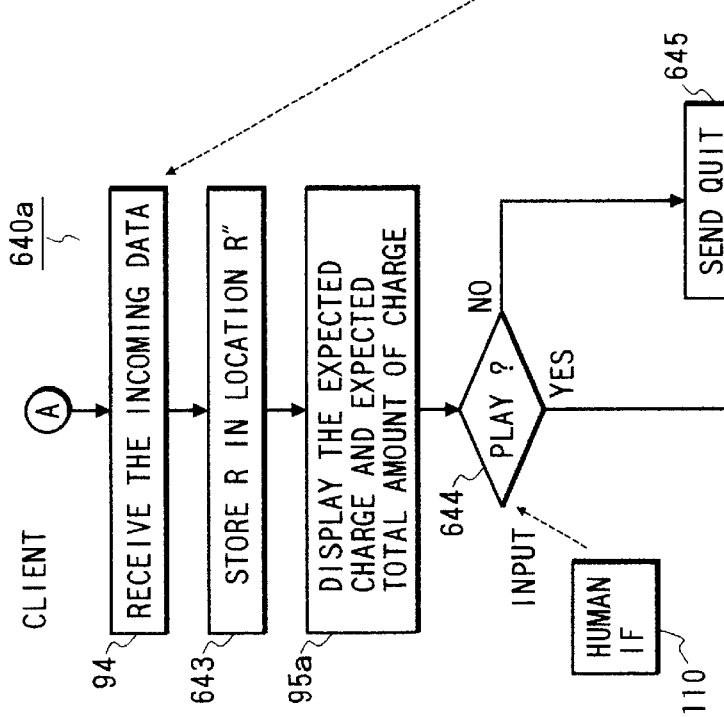

FIGS. 16A and 16B are flow charts jointly showing a procedure formed of exemplary expected charge informing routines 640a and 640b interactively executed by the client 2 and the associated server 8, respectively. The routines 640a and 640b are very similar to the routine 97 except that in the routine 640, the DURATION ($D_n$) or "play time" has been replaced with RATE PER ACCESS and "charge"; between steps 92a and 93a, there has been added a step 641 of the server generating and storing a pseudo random number R in a memory location R'; in step 93a, the server sends the pseudo random number R as well; between steps 94 and 95a there has been added a step 643 of the client storing the received pseudo random number R in a memory location R" for subsequent use. The replacement of DURATION ($D_n$) with RATE PER ACCESS is achieved by accessing a RATE PER ACCESS field 74 instead of a DURATION field 73 in table 70. Further, in the routine 640 there have been added the following steps: in step 644 following the step 96a, the client 2 makes a check to see if the user decides to play the application; if not, the client 2 sends a quit message to the server of $SADD_s$ in step 645, and ends the routine 640; on the other hand, in step 642 following the step 93a, the server 8 of $SID_s$ waits for a call from the client 2 of $CADD_c$; on receiving a call from the client, the server makes another check in step 646 to see if what has been received is a quit message; if so, the client ends the routine 640; and if the user decided to play the application in step 644, which means that what the server has received is not a quit message but an encrypted credit card number as seen from the description below, then the client 2 and the server 8 proceed to the step 650 of FIG. 15.

In the next block 650, the server 8 obtains a user's credit card number (CCNOu) through the client 2 keeping the security of the card number as shown in FIGS. 17A and 17B. In step 647, the client 2 encrypts the credit card number of the user which has been input by the user through a human IF 110 with a key, i.e., the pseudo random number R which has been stored in a memory location R" in step 643 of FIG. 16A to obtain e2(R, CCNOu). In the next step 648, the client 2 further encrypts R+e2(R, CCNOu) with another key or a server public key read from the distribution descriptor 23 recorded in the burst cutting area of the DVD to obtain e1($PK_s$, R+e2(R, CCNOu)).

In the next step 649, the client 2 sends the encrypted data to the server 8. Through step 646 of FIG. 16B, the server proceeds to step 650, where the server 8 finds that what was received from the client $CADD_c$ is encrypted data. In the next step 651, the server 8 reads a server secret key $SK_s$ from an IC card 7. in the next step, the server 8 decrypts the received encrypted data with the server secret key $SK_s$ as follows;

d1($SK_s$, encrypted data)=d1($SK_s$, e1($PK_s$, R+e2(R, CCNOu))
 =R+e2(R, CCNOu).

In step 653, the server 8 makes a check to see if the just obtained pseudo random number R coincides with the random number R which has been stored in a memory location R' of the server. if so, the server 8 sends an enable message to the client of $CADD_c$, and in step 655 decrypts e2(R, CCNOu) with the pseudo random number R to obtain the user's credit card number CCNOu. On the other hand, in response to a reception of the enable message in step 657, the client 2 exits from the process. After step 655, the server also exits from the process. If the result is NO in step 653, then the server 8 sends a disable message to the client in step 656, and ends the process. In response to a reception of the disable message in step 657, then the client displays a message to this effect in step 658, and then ends the process.

After operation of block 650, the client 2 waits, in step 663, for a report from the server on whether the credit card for the transmitted card number (CCNOu) is valid or not, while the server 8 refers to the credit company associated with the card number in step 661 to see if the credit card is valid. if not, the server 8 informs the client 2 of the invalidity of the credit card in step 662, and ends the process. If the card is valid in step 661, the server 8 informs the client of the validity in step 667. If the client 2 receives a report from the server in step 663, the client makes another check in step 664 to see if the report indicates the validity of the card. If not, the client display a message to indicate the invalidity in step 665, and ends the process. If the report indicates the validity in step 664, which means the completion of step 667, then the client 2 and the server 8 proceed to the next block 670.

In step 670, the client 2 and the server 8 execute timed play and metered charge report routine. FIGS. 18A and 18B are flow charts jointly showing a procedure formed of routines 675ac and 675bc interactively executed for playing an application while timing the duration and displaying a charge and a total amount of charges after the play. In FIG. 18, the routines 675ac and 675bc are identical to the routine 675a and 675b in FIGS. 11A and 11B except that "time" has been replaced with "charge", and accordingly VM-METER and AM-METER have been replaced with VC-METER and AC-METER.

The operation, in the client 2, of playing an application on usage-sensitive charging is completed by block 675 of FIG. 15 or step 218a of FIG. 18A. After step 212a, the server 8 charges the play to the credit card number CCNOu obtained in step 655 of FIG. 17B in step 680. This completes the whole of the charged application play process of FIG. 15.

In this process, only information on charge is given to the user. It is very easy to provide information on both time and charge by adding steps 91 through 93 and 95 to the routines 640b and 640a, and by adding steps 210 and 218 to the routines 675bc and 675ac.

As described above, expected time and/or charge are (is) displayed before playing a user specified application. This is helpful for the user to decide whether to play the application. Additionally, charging is done based on the actually timed play duration. This makes the charging reasonable.

In the above description, the arrangement is such that the user has to input his or her credit card number CCNOu each time he or she wants to play an application. However, instead of doing this, the credit card number CCNOu may be stored in non-volatile memory or EEPROM 103 in a $PW_u$-encrypted form. In this case, CCNOu is obtained by decrypting $PW_u$-encrypted CCNOu (e.g., $e(PW_u, CCNOu)$) with a password entered by the user. That is, d(entered password, $e(PW_u, CCNOu))=CCNOu$.

Permit the Play Within a Preset Limit

Figure 19:
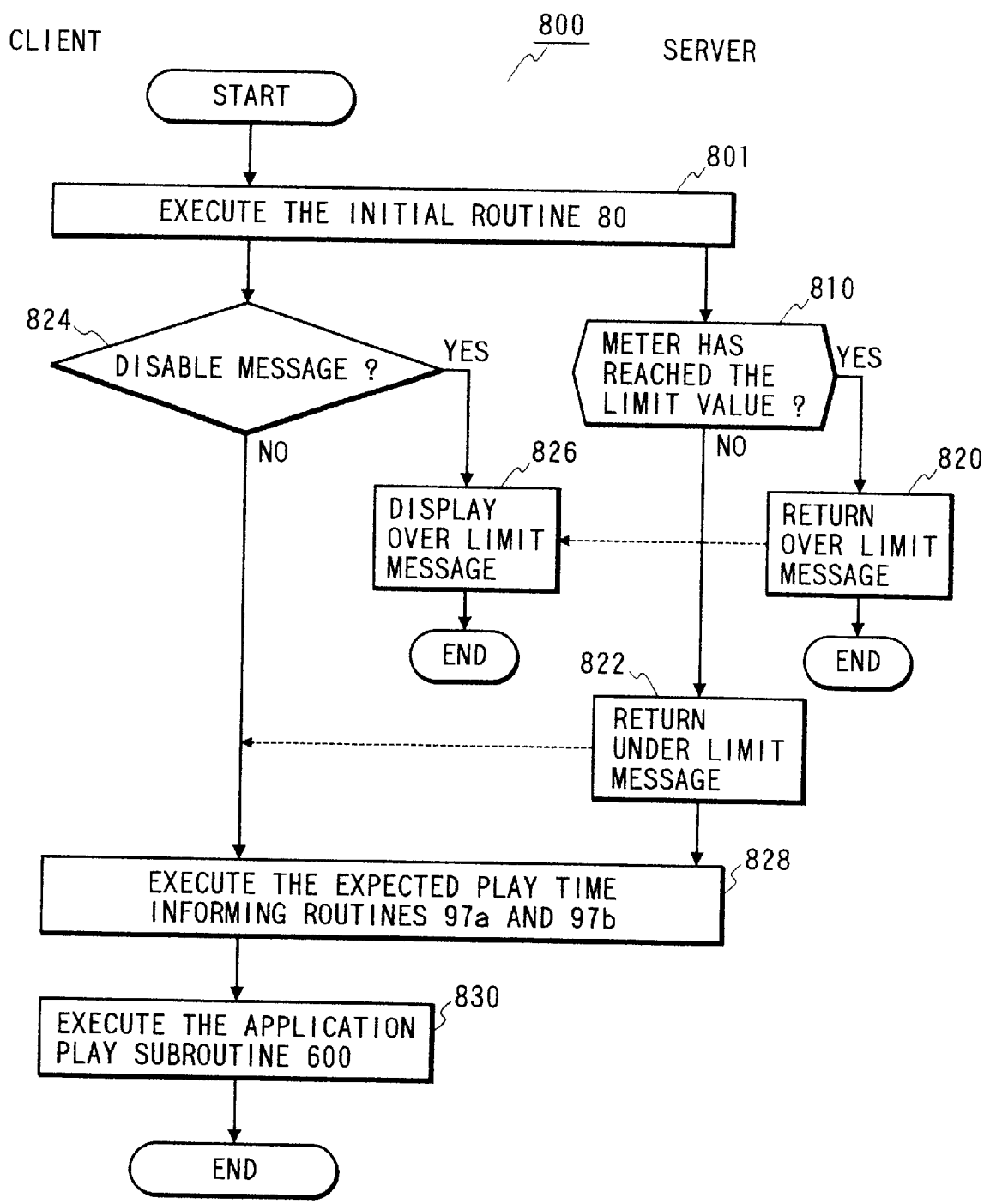
FIG. 19 is a flow chart showing a procedure interactively executed by the client 2 and the server 8 in the operation block 800 of FIG. 5, wherein blocks connected with two flow lines indicates that operation of the blocks is done by the two elements 2 and 8.

FIG. 19 is a flow chart showing a procedure interactively executed by the client 2 and the server 8 in the operation block 800 of FIG. 5, wherein blocks connected with two flow lines indicates that operation of the blocks is done by the two elements 2 and 8. In this case, it is assumed that a preset limit is recorded in or on the application package and is transmitted from client 2 to server each time of play. On entering the process 800 via step 516 of FIG. 5. the client 2 proceeds to step 801, where the client 2 and the server 8 executes the initial routines 8S. It is noted that in routine 80b, if there is a record for $VID_v$ and $NO_{v-i}$, then the limit value ($LV_{v-i}$) field of the table 60 of FIG. 6A contains the limit value transmitted from the client 2, otherwise, the received limit value is stored in the $LV_{v-i}$ field when the record for $VID_v$ and $NO_{v-i}$ is added in step 88.

In step 810, the server 8 makes a check if a meter associated with the TOU code received from the client 2 is under the limit value. This check is made by comparing an LV field and LV-meter field associated with the TOU code in table 60. if the value of the LV-meter is equal to or greater than the LV field value, then the server returns an overlimit massage to the client 2 in step 820. If not, the server 8 returns an underlimit message to the client 2 in step 822, and proceeds to step 828. If the client 2 receives the overlimit message in step 824, then the client 2 displays a message to this effect. If not, the client 2 proceeds to the step 828.

Since the expected play time informing routines 97a and 97b and the application play subroutine 600 has been described above, the description of steps 828 and 830 are omitted.

According to this feature of the invention, it is possible to limit the use of charged information. This feature is especially useful in case when a user who have paid in advance for the use of the application package is permitted to use the application package within a limit value.

Though it has been assumed that the limit values are included in the application package, the limit values may be kept in the servers of the provider or distributer from the beginning. In this case, the limit values are fixed. However, if limit values are permitted to be set and recorded in the application package at the time of distribution or sales, the limit values are advantageously set according to an amount paid.

As is apparent from the foregoing, as a limit value, any use-limiting factors will do that can be measured in quantity. Such limit values are, for example, the effective date and time, the allowable expiration date and time, the maximum amount of play time, the allowable access count.

It is also possible to combine this feature with a charged application play feature. That is, an arrangement may be such that the user is permitted to use an application package on usage-sensitive charging only if the value of an LV-meter associated with the TOU is under the value of the corresponding LV or the value recorded in a field 33 or 34 of the distribution descriptor 23.

Modification I

In the above embodiment, applications, if more than one, in one volume are encrypted by an identical application encrypting key $K_v$. However, the applications APa in one volume may be encrypted with respective AP-encrypting keys $K_a$, where a lower case "a" following AP and K is a serial number assigned to each application ID. In this case, each of the AP-encrypting keys $K_a$ are encrypted with the user public key $PK_u$, and stored in the $PK_u$-encrypted AP-encrypting key ($K_a$) fields 32a in the distribution descriptor 23.

Modification II

It has been assumed that the user of the DVD 3 is limited to the purchaser thereof who have had the $PK_u$-encrypted AP-encrypting key ($K_v$) recorded on the DVD 3. However, the system may be so arranged that predetermined people, e.g., family members $FM_1, FM_2, \ldots, FM_N$ of the purchaser can use the DVD (N is the number of the family members). One of the ways to realize this is to encrypt the AP-encrypting key $K_v$ with a public key $PK_{u-n}$ of each member FMn (n=1, 2, . . . ,N) to obtain $e1(PK_{u-1}, K_v)$, $e1(PK_{u-2}, K_v), \ldots, e1(PK_{u-n}, K_v)$ and to record them in the $PK_{u-n}$-encrypted AP-encrypting key $e1(PK_{u-n}, K_v)$ fields 32 of the distribution descriptor 23 at the time of purchase of the DVD.

Modification III: $K_v$ Retrieval From Server

Figure 20:
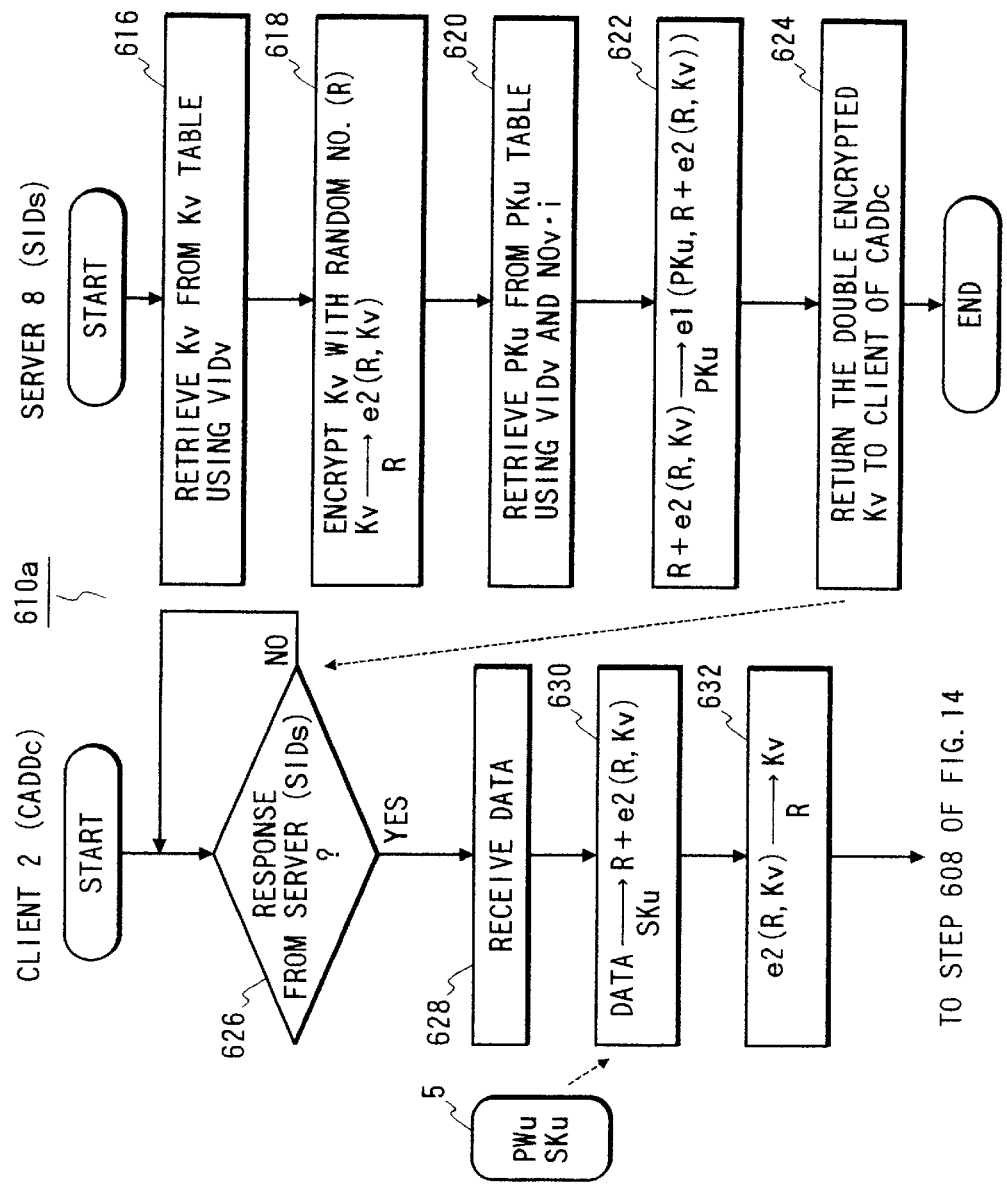
FIGS. 20A and 20B are a key-encrypting key table and a user's public key table, respectively, stored in the server.
FIG. 20C is a flow chart of a process for obtaining the application encrypting key $K_v$ from the server 8.

In the above description, the AP-encrypting key $K_v$ has been recorded in a $PK_u$-encrypted form on the DVD 3. However, the AP-encrypting key $K_v$ may be managed by the server 8 and transmitted to the client or the DVD player 2 in response to a request issued from the DVD player 2 each time of use of the DVD 3. In this case, there is no need of providing the distribution descriptor 23 with the $PK_u$-encrypted AP-encrypting key field 32. Instead each of the servers has to store an AP-encrypting key table (or $K_v$ table) and a $PK_u$ table (shown in FIGS. 20A and 20B) in the hard disc. As shown in FIG. 20A, the $K_v$ table a volume ID ($VID_v$) field (as the entry of record) and an AP-encrypting key ($K_v$) field in each record. In FIG. 20B, each record of the $PK_u$ table comprises a volume ID ($VID_v$) field (as the entry of record), a volume issue number ($NO_{v-i}$) field and a $PK_u$ field (Successive same values in the first field are shown by showing only the first appearing one). Further, the process (or step) 610 of obtaining the AP-encrypting key $K_v$, that is, a group of the steps 602, 604 and 606 in the application play routine 600, has to be replaced with a process of FIG. 20C.

FIG. 20C is a flow chart of a process in which the client DVD player 2 obtains the application encrypting key $K_v$ from the server 8. In step 616, the server 8 retrieves a key $K_v$ from the $K_v$ table by using $VID_v$. In the next step 618, the key $K_v$ is encrypted with an arbitrary number used only in the current process, e.g., a pseudo random number R to obtain $e2(R, K_v)$. In the next step 620, the server 8 retrieves a key $PK_u$ from the $PK_u$ table by reading the $PK_u$ field of the record which contains $VID_v$ and $NO_{v-i}$ in the $VID_v$ and $NO_{v-i}$ fields, respectively. In the next step 622, $R+e2(R, K_v)$ is encrypted with the retrieved key $PK_u$ to obtain a double encrypted AP-encrypting key $$e1(PK_u, R+e2(R, K_v)),$$

which is returned to the client with a client network address $CADD_c$ in the next step 624.

On the other hand, the controller 100 of the client 2 waits for a response from the server 8 of $SID_s$ in step 626. If there is any response from the server 8 of $SID_s$ in step 626, then the client DVD 3 receives the data $e1(PK_u, R+e2(R, K_v))$ from the server 8 in step 628. In the next step 630, the received data is decrypted with the user secret key $SK_u$ read from the IC card 5. Specifically, the following calculation is done.

$$d1(SK_u, e1(PK_u, R+e2(R, K_v))) \to R+e2(R, K_v)$$

In the next step 632, $e2(R, K_v)$ is decrypted with the obtained pseudo random number R. Specifically, the following calculation is done.

$$d2(R, e2(R, K_v)) \to K_v$$

Thereafter, the controller 100 proceeds to the step 608 of FIG. 14.

In this modification, the applications APa in one volume may be encrypted with respective AP-encrypting keys $K_a$. In this case, the $K_v$ table has to be replaced with a $K_a$ table in which each record comprises an application ID ($AID_a$) field and an AP-encrypting key ($K_a$) field. Further in step 612, the controller 100 of the DVD player 2 has to also send the application ID of the application to be played to the server.

Also in this modification, the system may be, again, so arranged that predetermined people, e.g., family members $FM_1, FM_2, \ldots, FM_N$ of the purchaser can use the DVD (N is the number of the family members). In this case, for each member FMn (n=1, 2, ..., N), the server 8 has to use the member's own public key $PK_{u-n}$ in encrypting the AP-encrypting key $K_v$. One way to realize this is to issue a volume issue number $NO_{v-i-n}$ to each member FMn at the time of sales of the DVD, provide the non-volatile memory (not shown) of the DVD player 2 with a table for associating the user's password PWn with the volume issue number $NO_{v-i-n}$, send the volume issue number ($NO_{v-i-n}$) associated with the user's password in step 612, and use not the $PK_u$ table but a $PK_{u-n}$ table in which each of the records has the following fields:

$VID_v$, $NO_{v-i-n}$, $PK_{u-n}$.

Another way is to issue and record not only a volume issue number $NO_{v-i}$ but also family member numbers FMNn for all members at the time of sales of the DVD, provide the non-volatile memory (not shown) of the DVD player 2 with a table for associating the user's password PWn with the corresponding family member number FMNn, send the volume issue number ($NO_{v-i}$) and the family member number FMNn associated with the user's password in step 612, and use another $PK_{u-n}$ table in which each of the records has the following fields:

$VID_v$, $NO_{v-i}$, FMNn, $PK_{u-n}$.

In the process of FIG. 20C, the server 8 may be authenticated by means of a public-key cryptosystem using a pair of server secret and public keys ($SK_s$, $PK_s$). In this case, the server 8 signs the double-encrypted AP-encrypting key $$e1(PK_u, R+e2(R, K_v))$$

with a signing key or the server secret key $SK_s$ after step 622. While the client or DVD player 2 tests the signature by the server 8 with a test key or the server public key $PK_s$ contained in the $PK_s$ field 31 of the distribution descriptor 23 recorded in the burst cutting area of the DVD 2 before step 630.

However, even if just described authentication of the server 8 is omitted, an attacker will never go to any greater length than a steal of TOU code plus limit value, a volume ID $VID_v$, a volume issue number $NO_{v-i}$, and the client network address $CADD_c$, This is not a serious problem.

In the process of FIG. 20C, a pseudo random number R has been used as a pseudo variable which takes a different value each time of execution of the process. However, as the pseudo variable, any thing will do if the result of encryption with it takes a different value each time of execution of the process.

Modification IV

Figure 21:
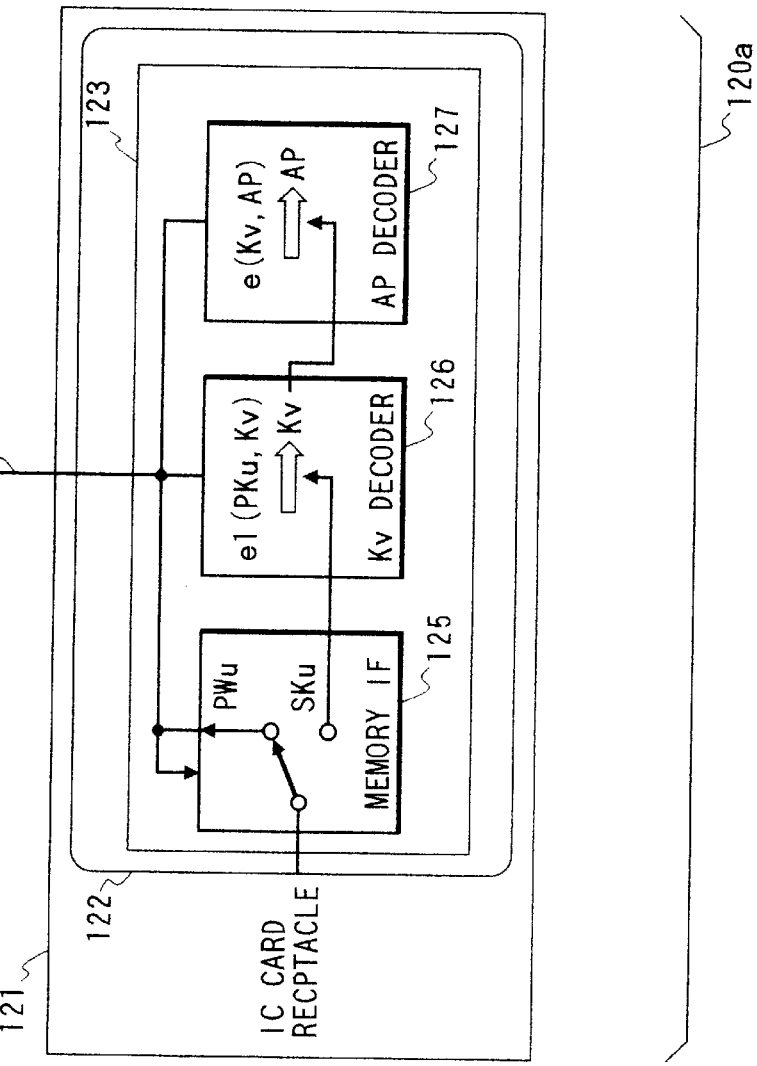
FIG. 21 is a block diagram of an exemplary decipherer-built-in IC card IF according to the invention.

In the first illustrative embodiment, the decryption of application is achieved by software. For this purpose, the controller 100 has to read the user secret key $SK_u$ from the IC card 5 through the bus 102, which leaves the possibility of permitting a breaker to easily steal the user secret key $SK_u$ through the bus 102. In order to prevent this, the process achieved by the steps 604 through 608 may be realized by hardware as shown in FIG. 21, which is a block diagram of an exemplary decipherer-built-in IC card IF. In FIG. 21, the decipherer-built-in IC card IF 120a comprises an IC card receptacle 121 and a printed wiring board 122 extending from and fixed with the receptacle 121. An IC 123 is mounted on the printed wiring board 122. The IC 123 comprises a memory IF 125 which usually connects the memory of the IC card 5 with the bus 102 and, in response to an instruction from the controller 100, reads and passes the key $SK_u$ to the next stage; a $K_v$ decoder 126 for receiving the key Sku and encrypting $e1(PK_u, K_v)$ with the key $SK_u$ to yield $K_v$; and an AP decoder 127 for receiving the key $K_v$ and encrypting $e(K_v, AP)$ to yield application data (AP). The printed wiring board 122 portion may be preferably molded together with the IC card receptacle 121 portion so as to make the whole a single body. By doing this, leaking of the user secret key $SK_u$ can be prevented.

Figure 22:
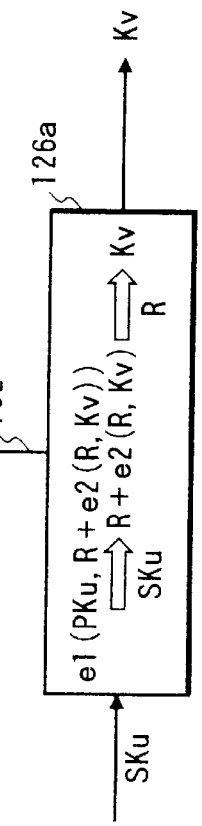
FIG. 22 is a diagram showing a $K_v$ decoder used in place of the $K_v$ decoder 126 of FIG. 21 in a system 1 using the cryptosystem of FIG. 20C.

This modification can be also applied to a system 1 using the cryptosystem of FIG. 20C. In this case, the $K_v$ decoder 126 of FIG. 21 has to be replaced with a $K_v$ decoder 126a as shown in FIG. 22. In FIG. 22, the $K_v$ decoder 126a decrypts the input data, $e1(PK_u, R+e2(R, K_v))$, from the bus 102 by using the user secret key $SK_u$ passed by the memory IF 125 to obtain $R+e2(R, K_v)$, while decrypting the obtained data $e2(R, K_v)$ with the obtained random number R and outputting the key $K_v$.

Embodiment II

Figure 24:
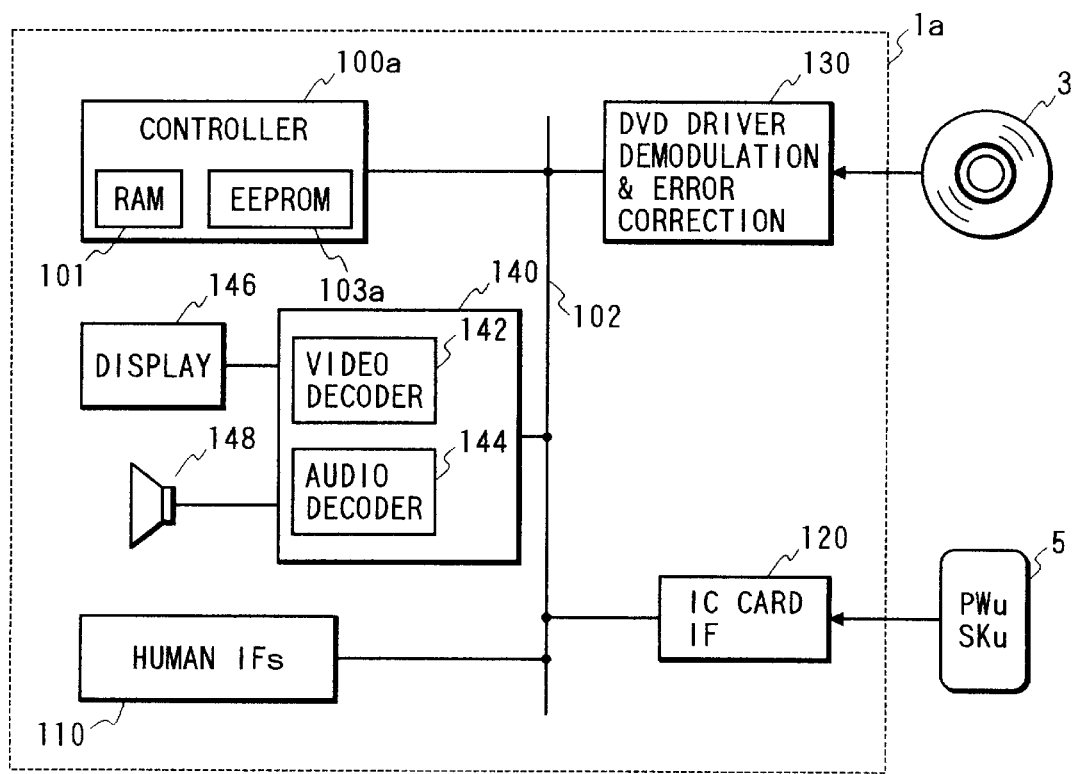
FIG. 24 is a block diagram showing an arrangement of a system for playing a distributed application package on the terms of use of the package without communicating with any server according to a second illustrative embodiment of the invention.

FIG. 24 is a block diagram showing an arrangement of a system capable of playing a distributed application package, e.g., a DVD on the terms of use of the DVD without communicating with any server according to a second illustrative embodiment of the invention. In FIG. 24, the system 1a is identical to the client 2 of FIG. 1 except that the communication IF 150 has been eliminated because of no need of communication with a server and the controller 100 has been replaced with a controller 100a. In the controller 100a, a not-shown ROM for storing a control program as described later and the EEPROM 103 have been also replaced with a new ROM (not shown) and an EEPROM 103a. In order to play a role of the server 8, the system 1a has to have table 60 of FIG. 6A in any non-volatile memory, e.g., the EEPROM 103a and an application duration (play time) for each application as defined in table 70 of FIG. 6B has to be included in the control data of each application package.

FIG. 25 schematically shows an exemplary control program executed by the controller 100a shown in FIG. 24. The control program of FIG. 25 is also identical to that of FIG.

5 except that the decision step 516 and the step 700 has been eliminated because the limit-attached play mode is not supported by the system 1a in this embodiment, and the steps 650 and 800 are replaced with steps 650a and 800a. Accordingly, operation after step 514 will be described in the following.

If the lower digit of the terms-of-use (TOU) code is 0 in the decision step 514, then in step 650a the controller 100a plays, in the free play mode, the application stored in the selected application in step 506 or 512 and ends the operation. It should be noted that since the system 1a does not have the charged play mode, the lower digit of the TOU code is defined as follows.

| Higher digit of terms-of-use code (Hexadecimal) | Corresponding limit value | Play mode |
|---|---|---|
| 0 | None | Free play mode |
| 2 | Effective date and time | Limit-attached play mode |
| 3 | Allowable expiration date and time | |
| 4 | Maximum amount of used period | |
| 5 | Allowable access count | |
| . | . | |
| . | . | |
| . | . | |

Accordingly, if the lower digit of the TOU code is not 0 in the decision step 514, then in step 800a the controller 100a plays, in the limit-attached play mode, the application stored in the selected application in step 506 or 512 and ends the operation.

Figure 26:
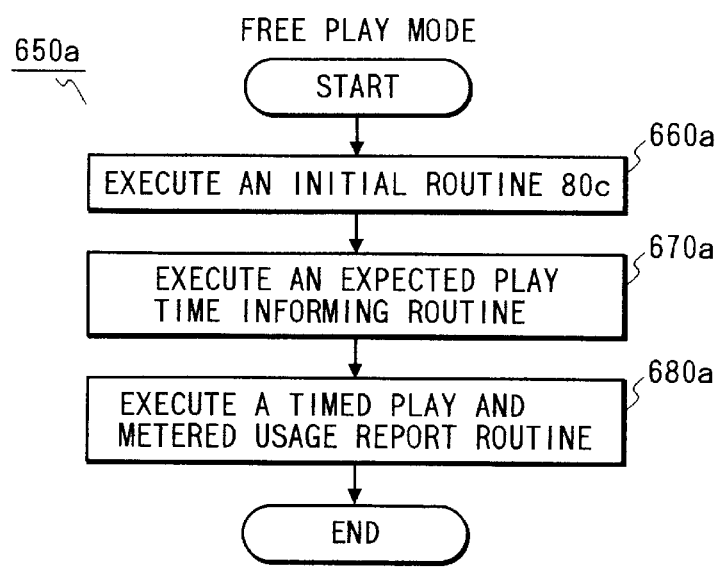
FIGS. 26 an 27 are flow charts showing an operation of a free play mode shown in step 650a of FIG. 25 in a detailed form and a further detailed form, respectively.
Figure 27:
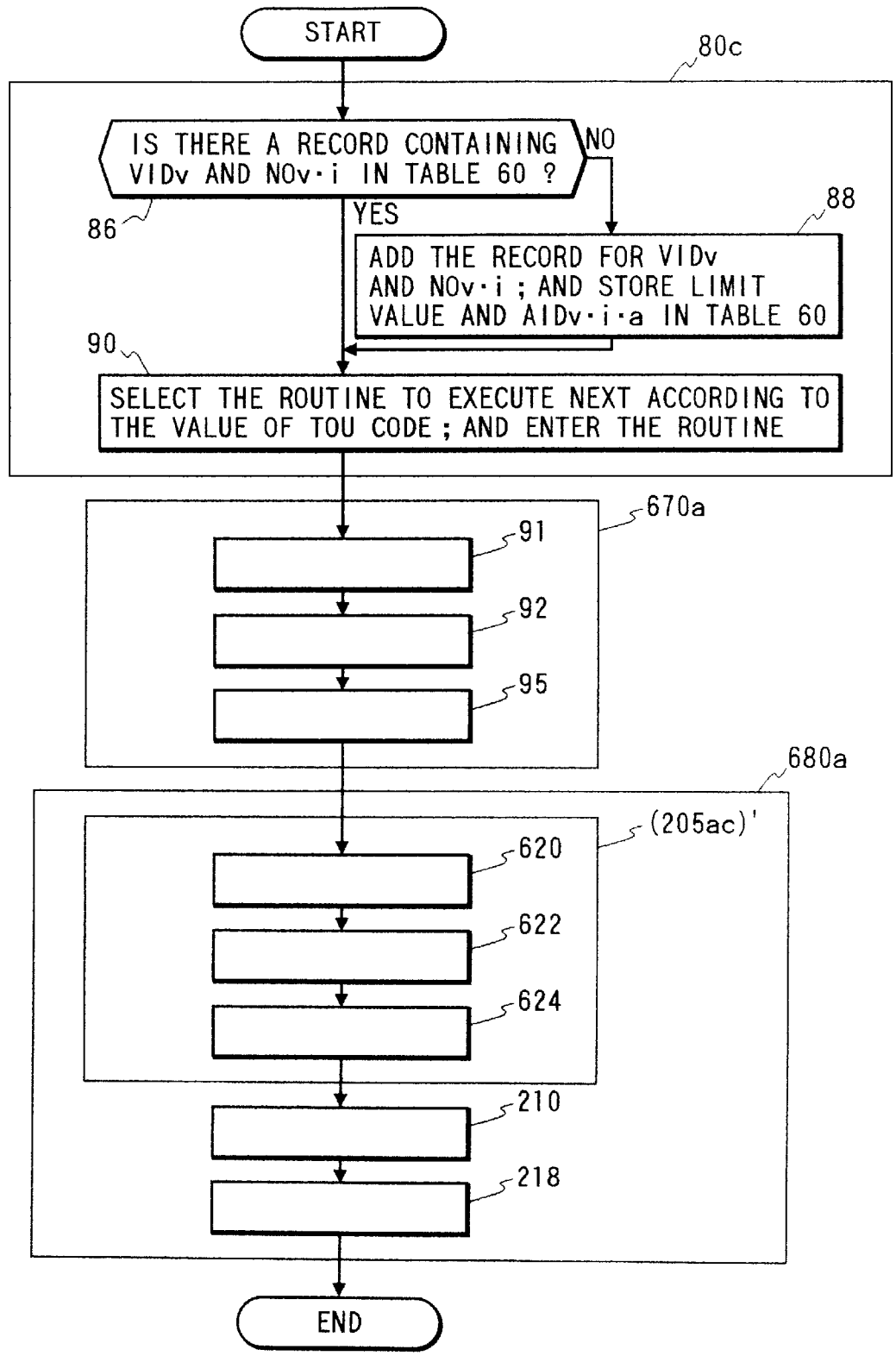

FIGS. 26 and 27 show an operation of a free play mode shown in step 650a of FIG. 25 in a detailed form and a further detailed form, respectively. In FIG. 26, the controller 100a executes an initial routine 80a in step 660a, in step 670a executes an expected play time informing routine, and in step 680a executes an application play and metered play time report routine.

As shown in FIG. 27, in the initial routine 80c, the controller 100a searches the table 60 for a record which contains $VID_v$ and $NO_{v-i}$ in the volume ID and issue No. fields thereof, respectively in step 86. If the search is unsuccessful, then the controller 100a adds the record for $VID_v$ and $NO_{v-i}$ and fills relevant fields with $AID_{v-i-a}$ and a limit value, if any, in the table 60 in step 88, and proceeds to step 90. Also, If the search in step 86 is successful, the server 9 proceeds to step 90, where the controller 100a selects a routine to execute next according to the value of the TOU code and enters the selected routine. In this case, if the TOU code=x0H (x: an arbitrary HEX number, the letter H in the last position indicates that the preceding number is in hexadecimal), then a routine for playing an application free of charge is selected. If the TOU code$\geq$x1H, then a routine is selected which plays an application only if the software meter of a use-limiting factor is under a preset value.

The expected play time informing routine 670a is identical to the routines 97 (FIG. 10) minus communication steps 93 and 94, comprising the above described steps 91, 92 and 95. Similarly, it is seen from FIGS. 11 and 13A that the above described steps 620, 622, 624, 210 and 218 are executed in this order in the timed play and metered usage report routine 680a. In this way, the system 1a permits the user to play the application stored in the selected application (steps 506 and 512 of FIG. 25) free of charge.

FIG. 28 is a flow chart showing an operation of a limit-attached play mode shown in step 800a of FIG. 25. Since this operation is very similar to that of FIG. 19, only the flow is briefly described, omitting the details of each step. In FIG. 28, controller 100a first makes a check if a meter associated with the TOU code has reached the limit value obtained with the TOU code. If so, then the server returns an overlimit massage to controller 100a in step 820. Otherwise, the controller 100a proceeds to the expected play time informing routine 828a (=670a), where the controller 100a executes the above described steps 91, 92 and 95, and then calls the application play subroutine 600 in step 830, thereby completing the operation. Since the application play subroutine 600 has been detailed above, further description is omitted. In this way, the system 1a permits the user to play the application stored in the selected application (steps 506 and 512 of FIG. 25) only if the limit value associated with the TOU code assigned to the volume or the user-specified application has not been reached.

According to the second embodiment, the system 1a can operate in either of the free play mode and the limit-attached play mode without the need of communication with a server. For this, the system 1a may be made portable.

Modifications

In the above description, the illustrative embodiment has been described in conjunction with the DVD. The same discussion can be applied to such package media as permit write once or more.

Further, the present invention is also applicable to application packages distributed via transmission media. In this case, the distributed application packages are stored in a bulk storage in the user's device. An application package comprises one or more application and application control data, that is, an application descriptor and distribution descriptor. One volume is stored as a file. Since a plurality of application package may be stored in a single storage, each application package does not have to contain a control program. One control program, which may be distributed via either package or transmission media, is enough for one user device. The folder or directory in which the application packages are stored is set for a user specified one in the control program when the control program is installed. The data to be recorded in the distribution descriptor is included in the application package by the provider according to the information given by the user.

As described above, one who is permitted to use an application package is limited to an owner of the IC card which stores a user secret key $SK_u$ corresponding to the user public key $PK_u$ used for encryption of the AP-encrypting key $K_v$ in the application package. For this, even if someone has unjustly obtained an application package, for example, by copying the whole volume from the DVD on which the volume is recorded, he or she can not use it without the IC card of the owner of the DVD. Thus the inventive system can prevent unjust use of an application package (DVD in this case) by any other person than the regular owner of the application package.

Also, the inventive system is so arranged that most part of the application package is recorded by pressing in manufacturing process of the DVDs, whereas at least a part of the volume control data (i.e., the distribution descriptor) can be determined at the time of, e.g., distribution of each of the DVDs after the manufacturing process. This makes the system flexible because control data can be easily changed without changing the stamper.

In the initial routines 80a and 80b in FIG. 8A and BB, the data transmitted with the service request may be encrypted in the same manner as in case of the transmission of user's credit card number shown in FIG. 17. However, in case of the initial routines, there are a plurality of data. These data may be encrypted in the following way.

If the data to be encrypted are D1, D2, . . . then they are first encrypted with a key R as follows:

e2(R, D1), e2(R, D2), . . .

Then further encryption is made with a server public key $PK_s$ as follows:

e1($PK_s$, R+e2(R, D1)+e2(R, D2), . . . ).

In the process of FIG. 17, the user may be authenticated by means of a public-key cryptosystem using a pair of user secret and public keys ($SK_u$, $PK_u$). In this case, the client 2 signs the double-encrypted credit card number e1($PK_s$, R+e2(R, CCNOu))

with a signing key or the user secret key $SK_u$ after step 648. While the server tests the signature by the client 2 with a test key or the user public key $PK_u$ before step 650.

Instead of storing a single server public key in the distribution descriptor 23, a plurality of server public keys or all the server public keys may be recorded. By doing this, it is possible, for example, to setting a different charge depending on the server public key which the user have selected by appropriately combining the tables 70 and 75.

Also, application packages with an identical volume ID can have different server public keys recorded. A plurality of toll center may be advantageously provided for application packages of the same title.

In order to prevent any use of IC card by other person than the owner of the IC card, it is possible to add, before the Sku reading step 604, the steps of prompting the user to enter a password through a human IF 110 and proceeding to step 604 only if the entered password coincides with the user password $PW_u$ stored in the IC card.

Though the IC card 5 is used in the above embodiment, the IC card IF 120 may be replaced with a magnetic card reader to permitting the use of the magnetic card. Alternatively, the arrangement may be such that the user enters his or her password each time the user uses the DVD.

Instead of storing the user secret key $SK_u$ in the IC card 5, the key Sku may be stored in non-volatile memory in a $PW_u$-encrypted form. In this case, the key $SK_u$ is obtained by decrypting $PW_u$-encrypted $SK_u$ with a password entered by the user.

The discussion of three preceding paragraphs are applied to the IC card used for storing the server secret key in the server. However, in this case the user has to be taken as the administrator of the toll server.

Many widely different embodiments of the present invention may be constructed without departing from the spirit and scope of the present invention. It should be understood that the present invention is not limited to the specific embodiment described in the specification, except as defined in the appended claims.

What is claimed is:

1. An article of manufacture comprising:
   a computer-readable medium having an application package embodied therein for permitting a system with application play and/or execution capability to play an application contained in the application package (also referenced herein as "said volume"), the application package comprising:
   secured representations of at least one application, said secured representations having been secured by an encryption key; and
   volume control data for use in controlling said system, wherein said volume control data include:
   additional control data which are added at a time of distribution of said volume after manufacturing said volume, said additional control data including:
   a user's public key-encrypted version of said encryption key;
   mode codes which are assigned to said volume or said at least one application and each indicate a play mode associated with one of said volume or said at least one application to which the mode code is assigned; and
   if necessary, limit values associated and used with said respective mode codes and indicating limitations in use of said volume or said at least one application,
   whereby each of said at least one application is played or executed in a manner defined by the mode code associated therewith.

2. A method for permitting an authentic user to play a desired one of a plurality of applications contained in a distributed application package in a system capable of playing an application, wherein said applications are contained as encryption key-encrypted versions thereof, wherein said application package (also referenced herein as "said volume") contains volume control data used for controlling said system, said volume control data including a mode code assigned to said volume or each of said applications of said volume and, a user's public key-encrypted encryption key so encrypted as to be able to be decrypted with a secret key of said authentic user into said encryption key, the method comprising the steps of:
   deciding to use one of a plurality of predetermined play modes specified by one of said mode codes associated with said desired application; and
   playing said desired application in said specified play mode, said step of playing said desired application including the steps of:
   obtaining said secret key which corresponds to a public key of said authentic user from a current user of said system;
   trying to decrypt said user's public key-encrypted encryption key with said obtained secret key to obtain said encryption key; and
   in response to a success in said trying step, decrypting an encryption key-encrypted version of said desired application with said obtained encryption key into said desired application.

3. A method as defined in claim 2, wherein the method further comprises the step of including, in said mode codes, values indicative of a free play mode and at least one limit-attached play mode which correspond(s) to respective limit value(s) used for limiting usage.

4. A method as defined in claim 3, wherein said step of playing said desired application comprises the step of:
   in response to a determination that said one of said mode codes associated with said desired application includes a value indicative of said free play mode, simply playing said desired application.

5. A method as defined in claim 3, wherein said step of playing said desired application comprises the step of:
   in response to a determination that said one of said mode codes associated with the desired application includes one of values indicative of said at least one limit-attached play mode, displaying a message to the effect that a limit value associated with said one of values has been reached instead of playing said desired application if said limit value has been reached.

6. A method as defined in claim 2, wherein said volume control data further includes a volume ID, an issue number and an application ID for each of said applications, and wherein said step of deciding to use one of predetermined play modes comprises the steps of:

obtaining said one of said mode codes associated with said desired application and corresponding limit value by using said application ID; and comparing said one of said mode codes with a meter value associated with said volume ID, said issue number and said application ID.

7. A system for permitting an authentic user to play a desired one of a plurality of applications contained in a distributed application package, wherein said applications are contained as encryption key-encrypted versions thereof, wherein said application package (also referenced herein as "said volume") contains volume control data used for controlling said system, said volume control data including a mode code assigned to said volume or each of said applications of said volume and a user's public key-encrypted encryption key so encrypted as to be able to be decrypted with a secret key of said authentic user into said encryption key, the system comprising:

means for deciding to use one of a plurality of predetermined play modes specified by one of said mode codes associated with said desired application; and means for playing said desired application in said specified play mode, said means for playing said desired application including:

means for obtaining said secret key which corresponds to a public key of said authentic user from a current user of said system;

decryption means for trying to decrypt said user's public key-encrypted encryption key with said obtained secret key to obtain said encryption key; and means, responsive to a success in a trial by said decryption means, for decrypting an encryption key-encrypted version of said desired application with said obtained encryption key into said desired application.

8. A system as defined in claim 7, wherein the system further comprises means for including, in said mode codes, values indicative of a free play mode and at least one limit-attached play mode which correspond(s) to respective limit value(s) used for limiting usage.

9. A system as defined in claim 8, wherein said means for playing said desired application comprises:

means, responsive to a determination that said one of said mode codes associated with said desired application includes a value indicative of said free play mode, for simply playing said desired application.

10. A system as defined in claim 8, wherein said means for playing said desired application comprises:

means, responsive to a determination that said one of said mode codes associated with the desired application includes one of values indicative of said at least one limit-attached play mode, for displaying a message to the effect that a limit value associated with said one of values has been reached instead of playing said desired application if said limit value has been reached.

11. A system as defined in claim 7, wherein said volume control data further includes a volume ID, an issue number and an application ID for each of said applications, and wherein said means for deciding to use one of predetermined play modes comprises:

means for obtaining said one of said mode codes associated with said desired application and corresponding limit value by using said application ID; and means for comparing said one of said mode codes with a meter value associated with said volume ID, said issue number and said application ID.

12. A method for permitting an authentic user to play a desired one of the applications contained in a distributed application package in a system comprising a client capable of playing an application and a server connected with said client through a communication network, wherein said applications are contained as encryption key-encrypted versions thereof, wherein said application package (hereinafter referenced as "said volume") contains volume control data used for controlling said client, said volume control data including a volume ID for identifying the kind of said volume, an issue number unique to said volume, and a mode code assigned to said volume or each of said applications of said volume, the method comprising the steps of:

said client deciding to use one of predetermined play modes specified by one of said mode codes associated with said desired application; and playing said desired application in said specified play mode by means of cooperation between said client and said server, said step of playing said desired application including the steps of:

said client setting said server in said specified play mode by sending said volume ID and said issue number to said server;

in said server:

retrieving an encryption key by using said volume ID;

retrieving a user's public key associated with said volume ID and said issue number;

double-encrypting said encryption key with a random number and said user's public key into a double-encrypted version of said encryption key;

sending said double-encrypted version to said client;

in said client:

receiving said double-encrypted version from said server;

obtaining a secret key which corresponds to said public key of said authentic user from a current user of said client;

decrypting said double-encrypted version with said secret key into said radome number and an encryption key encrypted with said random number;

decrypting said random number-encrypted encryption key with said random number into said encryption key; and decrypting an encryption key-encrypted version of said desired application with said encryption key.

13. A method as defined in claim 12, wherein the method further comprises the step of including, in each of said mode code, a value indicative of one of a free play mode, a charged play mode and at least one limit-attached play mode, wherein said volume control data further comprises a limit value associated with each of said at least one limit-attached play mode.

14. A method as defined in claim 12, wherein said volume control data further includes a volume ID, an issue number, and an application ID for each of said applications, and wherein said step of playing said desired application in said specified play mode includes an application play step of simply playing said specified application.

15. A method as defined in claim 14, wherein said step of playing said desired application further comprises the steps, executed prior to said application play step, of:

said server retrieving an expected play time associated with said desired application; and displaying said expected play time on a display device of said client.

16. A method as defined in claim 14, wherein said step of playing said desired application further comprises the steps of:
   measuring, as a measured play time, a duration of said application play step;
   adding said measured play time to a play time meter associated with said mode code to obtain a total amount of play time; and
   displaying said measured play time and said total amount of play time on a display device of said client after said application play step.

17. A method as defined in claim 16, wherein said step of measuring a duration comprises the step of measuring said play time by using a timer of said server.

18. A method as defined in claim 16, wherein said step of measuring a duration comprises the step of measuring said play time using a timer of said client.

19. A method as defined in claim 14, wherein said step of deciding to use one of predetermined play modes comprises deciding to use said charged play mode if said one of said mode codes associated with said desired application includes a value indicative of said charged play mode, and wherein said step of playing said desired application comprises the steps of:
   said client obtaining and sending a credit card number of said user to said server;
   proceeding to a next step only if the credit card of said number is found to be valid from a reference to an associated credit company;
   displaying, on a display device of said client, a charge for play decided based on a measurement of a duration of said application play step and a total amount of play charges after said application play step; and
   said server charging said play to said credit card number.

20. A method as defined in claim 19, wherein said step of playing said desired application further comprises the steps, prior to said application play step, of:
   displaying, prior to said application play step, an expected charge and an expected total amount of charges on said display device; and
   letting the user decide whether to play said desired application.

21. A method as defined in claim 19, wherein said step of said client obtaining and sending a credit card number of said user to said server comprises the steps of:
   in said server,
      generating a pseudo random number;
      storing said pseudo random number in memory;
      transmitting said pseudo random number to said client;
   in said client,
      prompting said user to input said credit card number;
      double-encrypting said credit card number first with said transmitted random number and then with a server's public key included in said volume control data into a double-encrypted number;
      sending said double-encrypted number to said server;
   in said server,
      decrypting said double-encrypted number with a servers secret key into a decrypted random number and another decrypted data; and
      decrypting said another decrypted data with said transmitted random number to obtain said credit card number.

22. A method as defined in claim 21, wherein said step of said client obtaining and sending a credit card number of said user to said server further comprises the steps, executed prior to said step of decrypting said another encrypted data, of:
   proceeding to a next step only if said decrypted random number coincides with said pseudo random number which has been stored in said memory; and
   displaying a message informing a failure in decryption and quitting the operation otherwise.

23. A method as defined in claim 14 wherein said step of deciding to use one of predetermined play modes comprises deciding to use one of said at least one limit-attached play mode if said one of said mode codes associated with said desired application includes a value indicative of said one of said at least one limit-attached play mode, and wherein said step of playing said desired application comprises the step of:
   in response to a determination that a meter value associated with said one of said mode codes associated with said desired application in a record identified by said volume ID, said issue number and an application ID of said desired application in a volume data table has reached a limit value associated with said mode code, displaying a message informing an overlimit on a display device of said client instead of executing said application play step.

24. A method as defined in claim 23, wherein said limit value is one of effective date and time, allowable expiration date and time, a maximum amount of play time, and an allowable access count.

25. A system for playing a distributed application package in one of a plurality of predetermined play modes in concert with a server, wherein the application package (also referenced herein as "said volume") contains a data set encrypted with an encryption key for each of at least one application and volume control data for use in controlling operation of the system and the server, the volume control data including a volume ID for identifying the kind of said volume, an issue number unique to said volume, and a mode code defining said play modes, the system comprising:
   means for permitting a user to select one of said at least one application of said volume;
   decision means for deciding to use one of said predetermined play modes associated with one of said mode codes assigned to said selected application; and
   means for playing said selected application in said selected play mode in concert with said server, said means for playing said selected application comprising:
      means for setting said server in said one of said predetermined play modes by at least sending said volume ID and said issue number to said server;
      means for receiving a double-encrypted version of said encryption key from said server;
      means for obtaining a secret key from a current user of the system;
      means for decrypting said double-encrypted version with said secret key into first data comprising a first part and a second part;
      means for decrypting said second part with said first part to obtain second data as said encryption key; and
      means for decrypting an encryption key-encrypted version of said selected application with said second data, i.e., said encryption key.

26. A system as defined in claim 25, wherein each of said mode codes includes one of values for a free play mode, a charged play mode and at least one limit-attached play mode.

27. A system as defined in claim 25, wherein said decision means comprises means for deciding to use a free play mode and wherein said means for playing said selected application further comprises:

means for receiving data which is transmitted from said server in response to said setting said server; and displaying said data as an expected play time for said selected application.

28. A system as defined in claim 25, wherein said means for deciding to use one of said predetermined play modes comprises means for deciding to use a free play mode, and wherein said means for playing said selected application further comprises:

means for causing said server to obtain, as a measured play time, data of an operation period of said application play means;

means for receiving said measured playtime and a total amount of play time from said server; and means for displaying, just after the completion of operation by said application play means, said measured play time and said total amount of play time.

29. A system as defined in claim 28, wherein said means for causing said server to obtain data of said operation period comprises means for informing said server of the start and the end of operation by said application play means to utilize a timer of said server.

30. A system as defined in claim 28, wherein said means for causing said server to obtain data of an operation period comprises:

means for measuring said operation period of said application play means; and means for sending said operation period to said server for use in a calculation of said total amount of play time.

31. A system as defined in claim 25, wherein said decision means for deciding to use one of said predetermined play modes comprises means for deciding to use a charged play mode and wherein said means for playing said selected application further comprises:

means for obtaining and sending a credit card number of said user to said server;

means responsive to a verification result of said credit card from said server for starting a next process only if said result is positive; and means for displaying a charge for play decided based on a measured play time of said application play means and a total amount of play charges after operation of said application play means.

32. A system as defined in claim 31, wherein said means for playing said selected application further comprises:

means, activated prior to said receiving a double-encrypted version of said encryption key for displaying an expected charge and an expected total amount of charges and letting the user decide whether to play said selected application.

33. A system as defined in claim 31, wherein said volume control data of said distributed application package further includes a server's public key, and wherein said means for obtaining and sending a credit card number of said user to said server comprises:

means for prompting said user to input said credit card number;

means for receiving a random number from said server;

means for obtaining said server's public key from said volume;

means for double-encrypting said credit card number first with said random number and then with said server's public key into a double-encrypted data; and means for sending said double-encrypted number to said server.

34. A system as defined in claim 33, wherein said means for said client obtaining and sending a credit card number of said user to said server further comprises:

means responsive to a positive result of random number check from said server for starting a next process; and means responsive to a negative result of said random number check from said server for displaying a message indicative of a failure in said random number check and quitting the operation for said selected application.

35. A system as defined in claim 25, wherein:

said means for deciding to use one comprises means for deciding to use a limit-attached play mode; and said sending to said server includes sending a limit value associated with said mode code, and wherein said means for playing said selected application further comprises:

means, operative prior to said receiving a double-encrypted version of said encryption key for receiving from said server a limit check result indicative of whether a limit value associated with said mode code has been reached; and means responsive to an overlimit case of said result for starting a next operation.

36. A system as defined in claim 35, wherein said limit value is one of effective date and time, allowable expiration date and time, a maximum amount of play time, and an allowable access count.

37. A system for controlling through a communication network each of a plurality of client devices to play a distributed application package in one of predetermined play modes, wherein the application package (also referenced herein as "said volume") contains a data set encrypted with an encryption key for each of one or more applications and volume control data for use in controlling operation of the system and each client device and the volume control data includes a volume ID, an issue number, an application ID for each of said applications, and a mode code for said volume or mode codes for said applications, the system comprising:

a volume data table for storing, for each volume, said volume ID, said issue number, said mode code for said volume, said application ID and said mode code for each of said applications;

means for receiving a service request, a volume ID, an issue number, an application ID and a mode code and other data from a requesting client device;

means for deciding an operation mode on the basis of said mode code; and control means for controlling application playing means of said requesting client device to perform its application play function in said decided operation mode, said control means operating for:

retrieving an encryption key by using said volume ID;

retrieving a user's public key associated with said volume ID and said issue number;

generating a random number;

double-encrypting said encryption key with said random number and said user's public key into a double-encrypted version of said encryption key; and sending said double-encrypted version to said client device.

38. A system as defined in claim 37, wherein if said received mode code defines a charged play mode, then said control means activates means for receiving a credit card number of said user from said server;

means, responsive to a determination, from a verification of said credit card number, that said credit card number is not valid, for informing said client of invalidity and quitting the operation of said control means;

means, responsive to a determination, from said verification of said credit card number, that said credit card number is valid, for informing said client of a validity and proceeding to a next operation; and means for charging said play to said credit card number.

39. A system as defined in claim 38, wherein said control means further comprises:

an application data table for storing data for each kind of application;

means activated prior to operation of said application play means of said client for retrieving an expected charge from said application data table by using said received application ID;

means for calculating a sum of said expected charge and a value of a charge meter associated with said received volume ID or application ID depending on said received mode code;

means operative prior to operation of said application play means for sending said expected charge and said sum to said client; and means responsive to a receipt of a message of quitting for quitting operation of said control means.

40. A system as defined in claim 37, wherein:

said received mode code defines a limit-attached play mode; and said means for receiving a service request further receives a limit value associated with said mode code, and wherein said control means further comprises:

means for proceeding to a next operation only if the value of a software meter associated with said mode code in said volume data table is under said limit value; and means for sending a message informing an overlimit to said client and quitting the operation of said application playing means if the value of a software meter associated with said mode code in said volume data table is not under said limit value.

41. A system as defined in claim 40, wherein said limit value is one of effective date and time, allowable expiration date and time, a maximum amount of play time, and an allowable access count.

42. A computer data signal embodied in a carrier wave, wherein embodied in the computer data signal is an application package which, when used by a system with application play and/or execution capability, permits the system to play an application contained in the application package (also referred to as "said volume"), the application package comprising:

secured representations of at least one application, said secured representations having been secured by an encryption key; and volume control data for use in controlling said system, wherein said volume control data include:

additional control data which are added at a time of transmission of said computer data signal after compiling said volume, said additional control data including:

a user's public key-encrypted version of said encryption key;

mode codes which are assigned to said volume or said at least one application and each indicating a play mode associated with one of said volume or said at least one application to which the mode code is assigned; and if necessary, limit values associated and used with said respective mode codes and indicating limitations in use of said volume or said at least one application, whereby each of said at least one application is played or executed in a manner defined by the mode code associated therewith.

* * * * *

UNITED STATES PATENT AND TRADEMARK OFFICE
CERTIFICATE OF CORRECTION

PATENT NO. : 6,470,085 B1
DATED : October 22, 2002
INVENTOR(S) : Sachiko Uranaka et al.

It is certified that error appears in the above-identified patent and that said Letters Patent is hereby corrected as shown below:

Title page,
Item [56], References Cited, U.S. PATENT DOCUMENTS, add the following:
-- 5,142,578  A  *  8/1992   Matyas et al.
   5,544,245  A  *  8/1996   Tsubakiyama
   4,965,827  A  *  10/1990  McDonald
OTHER PUBLICATIONS,
O'Higgins et al., "Encrytion and ISDN - A Natural Fit", March 1997, Institute of Electrical and Electronics Engineers, pgs. 863-869*
   K. Yamanaka, et al.., "Copyright Protection in Multimedia On Demand Service", 1995, NTT R&D, Vol. 44, pgs. 813-818* --

Signed and Sealed this

Ninth Day of August, 2005

JON W. DUDAS
*Director of the United States Patent and Trademark Office*